United States Patent
Ishida

[19]

[11] Patent Number: 6,020,701
[45] Date of Patent: Feb. 1, 2000

[54] CONTROL APPARATUS FOR MOTOR-DRIVEN VEHICLE

[75] Inventor: Yoshinobu Ishida, Hyogo-ken, Japan

[73] Assignee: Nabco Limited, Kobe, Japan

[21] Appl. No.: 09/049,238

[22] Filed: Mar. 27, 1998

[30] Foreign Application Priority Data

Apr. 1, 1997 [JP] Japan ..................................... 9-099836
Jan. 16, 1998 [JP] Japan ..................................... 10-020401

[51] Int. Cl.[7] ..................................................... G05B 5/00
[52] U.S. Cl. .................................. 318/362; 318/445; 73/9; 180/197; 303/146
[58] Field of Search ................................... 318/362, 445; 73/9; 180/197; 303/146

[56] References Cited

U.S. PATENT DOCUMENTS

| | | | |
|---|---|---|---|
| 5,944,393 | 8/1999 | Sano | 303/187 |
| 5,947,221 | 9/1999 | Taniguchi et al. | 180/197 |
| 5,948,961 | 9/1999 | Asano et al. | 73/9 |

*Primary Examiner*—Karen Masih
*Attorney, Agent, or Firm*—Banner & Witcoff, Ltd.

[57] ABSTRACT

A control apparatus for a motor-driven vehicle driven by a motor brakes the vehicle without giving shock to the vehicle. The control apparatus includes a vehicle maneuvering section for sensing a manual driving force as applied to it. The control apparatus also includes a control circuit which, when a manual driving force for driving the vehicle is applied to the maneuvering section, causes the motor to provide a mechanical driving force for the vehicle in accordance with the sensed manual driving force. The control circuit includes a braking force providing device which gradually increases a braking force for braking the vehicle from zero when manual driving force has been removed from the maneuvering section.

38 Claims, 19 Drawing Sheets

| L \ R | C1 | | | | C3− | | | | C3+ | | | | C2 | | | |
|---|---|---|---|---|---|---|---|---|---|---|---|---|---|---|---|---|
| | 1:1 | | | | 3:2 | | | | 4:1 | | | | 1:0 | | | |
| | ar | br | al | bl | ar | br | al | bl | ar | br | al | bl | ar | br | al | bl |
| C1 | 0.5 | 0.5 | 0.5 | 0.5 | 0.6 | 0.4 | 0.6 | 0.4 | 0.8 | 0.2 | 0.8 | 0.2 | 1.0 | 0 | 1.0 | 0 |
| | 3:2 | | | | 1:1 | | | | — | | | | 4:1 | | | |
| | ar | br | al | bl | ar | br | al | bl | | | | | ar | br | al | bl |
| C3− | 0.6 | 0.4 | 0.6 | 0.4 | 0.5 | 0.5 | 0.5 | 0.5 | — | — | — | — | 0.8 | 0.2 | 0.8 | 0.2 |
| | 4:1 | | | | — | | | | 1:1 | | | | 3:2 | | | |
| | ar | br | al | bl | | | | | ar | br | al | bl | ar | br | al | bl |
| C3+ | 0.8 | 0.2 | 0.8 | 0.2 | — | — | — | — | 0.5 | 0.5 | 0.5 | 0.5 | 0.6 | 0.4 | 0.6 | 0.4 |
| | 1:0 | | | | 4:1 | | | | 3:2 | | | | 1:1 | | | |
| | ar | br | al | bl | ar | br | al | bl | ar | br | al | bl | ar | br | al | bl |
| C2 | 1.0 | 0 | 1.0 | 0 | 0.8 | 0.2 | 0.8 | 0.2 | 0.6 | 0.4 | 0.6 | 0.4 | 0.5 | 0.5 | 0.5 | 0.5 |

THE RATIO IS a:b

| (L) \ (R) | | FinR UNCHANGED | | FinR CHANGED | |
|---|---|---|---|---|---|
| | | $0 \leq |FinR| \leq \frac{Fsb}{2}$ | $\frac{Fsb}{2} < |FinR| \leq Fsb$ | $0 \leq |FinR| \leq \frac{Fsb}{2}$ | $\frac{Fsb}{2} < |FinR| \leq Fsb$ |
| FinL UNCHANGED | $0 \leq |FinL| \leq \frac{Fsb}{2}$ | 4 | 3 | 2 | −1 |
| | $\frac{Fsb}{2} < |FinL| \leq Fsb$ | 3 | 2 | 0 | −1 |
| FinL CHANGED | $0 \leq |FinL| \leq \frac{Fsb}{2}$ | 2 | 0 | 0 | −2 |
| | $\frac{Fsb}{2} < |FinL| \leq Fsb$ | −1 | −1 | −2 | −2 |

FIG. 20

| | | UPPER LIMIT (brk-max) | | |
|---|---|---|---|---|
| | | ABSOLUTE VALUE OF FinR | | |
| | | $0 \sim Fsb/2$ | $Fsb/2 \sim Fsb$ | $Fsb \sim$ |
| ABSOLUTE VALUE OF FinL | $0 \sim Fsb/2$ | 255 | 128 | 0 |
| | $Fsb/2 \sim Fsb$ | 128 | 128 | 0 |
| | $Fsb \sim$ | 0 | 0 | 0 |

CONTROL APPARATUS FOR MOTOR-DRIVEN VEHICLE

This application is based on Japanese Patent Application No. HEI 9-99836 filed on Apr. 1, 1997 and Japanese Patent Application No. HEI 10-20401 filed on Jan. 16, 1998 which claims domestic priority from the former application, which are both incorporated herein by reference.

FIELD OF THE INVENTION

The present invention relates to a control apparatus for a motor-driven vehicle, e.g. a motor-driven wheelchair, and more particularly, to such control apparatus which can provide smooth braking of the vehicle.

BACKGROUND OF THE INVENTION

Some motor-driven vehicles, e.g. motor-driven wheelchairs, have an electrical braking apparatus in addition to a mechanical braking apparatus. One example of electrical braking apparatus is shown in Japanese Examined UM Publication No. SHO 61-5841 published on Feb. 22, 1986. The braking apparatus shown in this UM publication detects when manual driving force is removed from a vehicle maneuvering section of the wheelchair, and starts braking. In the initial stage of the braking, the braking apparatus connects a resistor across the motor so as to provide gentle dynamic braking, and, then, directly short-circuits the motor when the voltage generated by the motor decreases.

The initial braking force of this braking apparatus is dependent on the speed at which the wheelchair is running when it is to be braked because the braking force is controlled by the resistor. Accordingly, even with a resistor having a relatively large resistance employed, a large braking force is abruptly applied to the wheelchair if the vehicle is running at a relatively high speed, so that a shock is given to the motor-driven wheelchair. Such a shock may jeopardize a person on the wheelchair, or may cause the vehicle maneuvering section to be erroneously operated to thereby disturb the behavior of the wheelchair.

An object of the present invention is to provide a control apparatus for a motor-driven vehicle with a braking apparatus. The control apparatus controls the braking apparatus such that it does not give a shock to the vehicle at the beginning of the braking of the vehicle.

SUMMARY OF THE INVENTION

One embodiment of the present invention directed to a control apparatus for a motor-driven vehicle driven by a motor. The control apparatus includes a vehicle maneuvering section for producing an electric signal for use in driving the vehicle by the motor. The electric signal corresponds to the manipulation of the maneuvering section. The control apparatus also includes a control unit for causing the motor to produce a motor driving force having a magnitude and direction corresponding to the electric signal for driving the vehicle. The control unit includes braking force providing means for gradually increasing a braking force to be provided for the vehicle from zero when the control unit judges that the manipulation of the maneuvering section has been discontinued.

When the vehicle maneuvering section is manipulated, the motor produces a motor driving force corresponding to the electric signal from the maneuvering section, and the motor driving force drives the vehicle. When the manipulation of the maneuvering section is discontinued, the braking force providing means gradually increases the braking force it provides from zero so that the vehicle can be braked without receiving a shock.

Another embodiment of the present invention is also directed to a control apparatus for a motor-driven vehicle driven by a motor. The control apparatus includes a vehicle maneuvering section for producing an electric signal for use in driving the vehicle by the motor. The electric signal corresponds to the manipulation of the maneuvering section. The control apparatus also includes a control unit for causing the motor to produce a motor driving force having a magnitude and direction corresponding to the electric signal for driving the vehicle. The control unit includes braking force providing means for gradually increasing a braking command from zero for causing the motor to produce a gradually increasing braking force when the control unit judges that the manipulation of the maneuvering section has been discontinued.

When the vehicle maneuvering section is manipulated, the motor produces a motor driving force corresponding to the electric signal from the maneuvering section, which drives the vehicle. When the manipulation of the maneuvering section is discontinued, the braking force providing means gradually increases the braking command from zero, whereby the motor gradually increases the braking force it provides, so that the vehicle can be braked without receiving a shock.

Another embodiment of the present invention is also directed to a control apparatus for a motor-driven vehicle driven by a motor. The control apparatus includes a vehicle maneuvering section which senses a manual driving force applied thereto to drive the vehicle and develops a manual-driving-force related signal related in magnitude and direction to the manual driving force applied to the maneuvering section. The control apparatus also includes a control unit for causing the motor to produce a motor driving force having a magnitude and direction determined by the manual-driving-force related signal. The control unit includes braking force providing means for gradually increasing a braking command from zero for causing the motor to produce a gradually increasing braking force when the control unit judges that the manual driving force has been removed.

When a manual driving force to drive the vehicle is applied to the vehicle maneuvering section, the motor produces a motor driving force corresponding to the manual driving force. The vehicle is driven by the sum of the motor driving force and the manual driving force. When the manual driving force is removed from the maneuvering section, the braking force providing means produces a braking command for braking the vehicle. Since the braking command increases gradually from zero, abrupt braking of the vehicle can be avoided, and, therefore, no shock is given to the vehicle. Since no shock is produced, a problem which is seen in the prior art vehicle of abrupt change of the manual driving force due to a shock which would result in instability of the motor driving force can be avoided.

In a further embodiment of the present invention the control unit converts the manual-driving-force related signal into a manual-driving-force representative signal which is zero when no manual driving force is being applied to the vehicle maneuvering section, and causes a motor driving force to be produced when, for example, the absolute value of the manual-driving-force representative signal reaches a reference value. The control unit judges that no manual driving force is being applied if, for example, the absolute value of the manual-driving-force representative signal becomes smaller than a judgment value which is smaller than the reference value but larger than zero.

In a further embodiment of the present invention, when the manual driving force is removed, the braking force is gradually increased from zero. The judgment that the manual driving force has been removed is made when the absolute value of the manual driving force decreases below the judgment value which is smaller than the reference value. With this arrangement, if the manual driving force applied to the vehicle maneuvering section of the vehicle is small, the braking force is applied to the vehicle so that the vehicle can be braked.

In a further embodiment of the present invention, when a motor driving force is developed, the control unit computes the difference between the value of the manual-driving-force representative signal and the reference value, and the computed difference is used as a change amount for use in changing the motor driving force. A new motor driving force is computed with the computed difference taken into account.

In a further embodiment of the present invention, the motor starts producing the motor driving force when the manual driving force reaches the reference value as noted above. A new motor driving force is computed from the previous motor driving force with the difference between the manual driving force and the reference value taken into account. Accordingly, once a manual driving force of such a magnitude as to produce the motor driving force of a desired magnitude is applied to the maneuvering section, the motor driving force of that magnitude is continuously provided by maintaining the manual driving force applied to the maneuvering section at the reference value.

In a further embodiment of the present invention, the control unit converts the manual-driving-force related signal into a manual-driving-force representative signal which is zero when no manual driving force is being applied to the vehicle maneuvering section. The control unit switches the operating mode of the vehicle between a driving mode of operation in which the control unit causes the motor to produce a motor driving force having a magnitude and direction determined by the manual-driving-force representative signal, and a braking mode of operation in which the braking force providing means is operated. The control unit selects the braking mode when, on condition that neither the driving mode nor the braking mode has been selected, the absolute value, for example, of the manual-driving-force representative signal is not greater than the judgment value.

When the absolute value of the manual-driving-force representative signal is below the judgment value, the operating mode of the vehicle is switched to the braking mode, and a gradually increasing braking force is applied to the vehicle. In this manner, the braking mode is automatically selected when the manual-driving-force representative signal decreases below the judgment value.

In a further embodiment, the control unit selects the driving mode when, for example, the absolute value of the manual-driving-force representative signal is not smaller than a reference value which is greater than the judgment value.

When the absolute value of the manual-driving-force representative signal is below the judgment value, the braking mode is selected so that gradually increasing braking force is applied to the vehicle, and when the absolute value of the manual driving force becomes above the reference value, the operation of the vehicle is switched to the driving mode. Like this, the vehicle can be automatically switched between the driving mode and the braking mode in accordance with the value of the manual driving force without need for dedicated mode switching means. Thus, the handling of the motor-driven vehicle is easy.

In a further embodiment, the control unit activates the braking force providing means a predetermined time after the braking mode is selected.

In this embodiment, even when the braking mode is selected, the braking force providing means does not immediately start operating, but it starts operating a predetermined time after the selection of the braking mode. Accordingly, even if the vehicle driver temporarily reduces the manual driving force below the judgment value, the braking force is not immediately applied to the vehicle, and, if the manual driving force increases above the judgment value within the predetermined time, no braking force is applied to the vehicle, and the vehicle is released from the braking mode.

In a further embodiment, when the braking mode is selected, the control unit activates the braking force providing means when the vehicle reaches a predetermined speed.

In this embodiment, the braking force providing means does not immediately start operating even when the braking mode is selected, but it starts operating when the vehicle attains a predetermined speed. Accordingly, when the vehicle attains a speed higher than a predetermined speed, braking force is immediately provided for the vehicle, but when the vehicle is moving at a speed lower than the predetermined speed, no braking force is applied. Accordingly, even if the manual driving force decreases below the judgment value, the vehicle is not braked as long as the vehicle speed is lower than the predetermined speed, because the vehicle need not be braked at such a speed.

In a further embodiment, when neither the braking mode nor the driving mode has been selected, the control unit judges that the vehicle is in an OFF mode of operation and causes power supply to the motor to be stopped.

In this embodiment, when the vehicle is neither in the driving mode nor in the braking mode, it is judged to be in an OFF mode of operation in which the motor is applied with neither a driving force nor a braking force. If, for example, the operating mode is switched from the braking mode directly to the driving mode, the vehicle may be abruptly driven to move and receive a shock. The OFF mode in which the motor is free is provided to prevent it.

In a further embodiment, the control unit causes the braking command to gradually decrease when the manual-driving-force representative signal becomes to have an absolute value smaller than the reference value but greater than the judgment value on condition that the vehicle is in the braking mode.

In this embodiment, when the vehicle driver switches the operating mode of the vehicle from the braking mode to the driving mode, the manual-driving-force representative signal will assume an absolute value smaller than the reference value but larger than the judgment value during the transition from the braking mode to the driving mode. If the operating mode is switched rapidly from the braking mode to the driving mode, a shock will be applied to the vehicle. In order to avoid it, when the manual-driving-force representative signal is at such a value as stated above, the braking force is gradually decreased to zero so that no shock is applied to the vehicle when it shifts into the driving mode.

In a further embodiment, the value of the manual-driving-force representative signal is classified into a zero region about the zero value and outside regions outside the zero region, and when the manual-driving-force representative signal is in the zero region in the braking mode of operation of the vehicle, the braking force providing means increases the braking command to a preset maximum value, and when the manual-driving-force representative signal is in the outer region, the braking force providing means increases the braking command toward an upper limit value which is lower than the maximum value by a predetermined value.

In this embodiment, the braking force does not increase beyond a predetermined value. This value is larger when the manual-driving-force representative signal is in the zero region, i.e. when substantially no manual driving force is being applied, and is smaller when the manual-driving-force representative signal is in the outer region, i.e. when a small manual driving force is being applied to the vehicle.

In a further embodiment, when the braking mode is selected, the braking force providing means sets an upper limit for the braking command to a value determined in accordance with the value of the manual-driving-force representative signal. The upper limit of the braking command is set higher as the manual-driving-force representative signal is nearer to the zero value. Accordingly, as the manual driving force is closer to zero, a larger braking force brakes the vehicle, whereas the braking force is smaller as the manual driving force is greater.

In this embodiment, once the braking force increases to a predetermined value, it does not go beyond that value. This value is larger as the manual-driving-force representative signal is closer to zero, i.e. as the manual driving force is lesser. Accordingly, as the manual driving force is closer to zero, a larger braking force is applied to the vehicle to keep it in the firmly braked state, and as the manual driving force is remoter from the zero value, the braked state of the vehicle is kept with a smaller braking force.

Another embodiment is directed to a control apparatus for a motor-driven vehicle driven by a motor. The control apparatus includes a vehicle maneuvering section for producing an electric signal for use in driving the vehicle by the motor. The electric signal corresponds to the manipulation of the maneuvering section. The control apparatus also includes a control unit for causing the motor to produce a motor driving force having a magnitude and direction corresponding to the electric signal for driving the vehicle. The control unit includes braking force providing means. When the control unit judges that the manipulation of the maneuvering section has been discontinued, the braking force providing means causes the motor to produce a dynamic braking force and, also, gradually increases the dynamic braking force from zero.

In this embodiment, since the dynamic braking force of the motor gradually increases when the manual driving force is removed from the vehicle maneuvering section, no shock is given to the vehicle. Furthermore, the vehicle can be braked without the use of a mechanical braking apparatus.

Another embodiment is directed to a control apparatus for a motor-driven vehicle driven by a motor. The control apparatus also includes a vehicle maneuvering section which senses a manual driving force applied thereto to drive the vehicle and develops a manual-driving-force related signal related in magnitude and direction to the manual driving force applied to the maneuvering section. The control apparatus also includes a control unit for causing the motor to produce a motor driving force having a magnitude and direction computed from the manual-driving-force related signal. The control unit includes braking force providing means which develops a braking command causing the motor to produce a dynamic braking force. The braking force providing means gradually increases the braking command from zero.

In this embodiment, the required braking force for the vehicle is provided through dynamic braking and, therefore, the vehicle can be braked without need for using any mechanical braking arrangement.

Another embodiment is directed to the control apparatus as set forth above wherein the control unit controls the motor by pulse width modulation (PWM). A PWM signal is used as the braking command, and the braking force providing means varies, for example, the duty ratio of the PWM signal.

In this embodiment, the motor is PWM controlled. Accordingly, in the braking mode, the vehicle can be braked by dynamic braking provided by the motor by short-circuiting the motor during, for example, a high-level interval of the PWM signal. As the duty ratio increases gradually from zero, the high-level interval becomes gradually longer, which results in gradual increase of the braking force provided for the vehicle.

Another embodiment is directed to the control apparatus as above wherein the value of the PWM signal is varied by a constant value each time the PWM signal is outputted.

In this embodiment, the portion of one period of the PWM signal occupied by, for example, the high-level interval is incremented by a constant value. Accordingly, the braking force increases at a constant rate.

In another embodiment, the value of the PWM signal is varied by a value computed each time the PWM signal is outputted.

In this embodiment, the portion of one period of the PWM signal occupied by, for example, the high-level interval gradually increases, but the amount of increase is not fixed but varied as occasion demands. For example, if the braking force is to be increased rapidly, a larger value is added to the PWM signal, whereas a smaller value may be added if it is desired to increase the braking force gradually.

Another embodiment is also directed to a control apparatus for a motor-driven vehicle driven by a motor. The control apparatus includes a vehicle maneuvering section which senses a manual driving force applied thereto to drive the vehicle and develops a manual-driving-force related signal related in magnitude and direction to the manual driving force applied to the maneuvering section. The control apparatus further includes a control unit for causing the motor to produce a motor driving force having a magnitude and direction computed from the manual-driving-force related signal. The control unit includes braking force providing means. When the control unit judges that the manual driving force has been removed, the braking force providing means provides a braking command to cause the motor to produce a plugging force, and gradually increases the braking command from zero.

The braking provided by the braking force above is not dynamic braking, but it is plugging.

In another embodiment, the control unit holds the value which the braking command assumes when the speed of the vehicles is judged to be zero.

In this embodiment, the braking force based on the plugging provided when the vehicle speed becomes zero is held. Therefore, if, for example, the vehicle is stopped by plugging when it goes down a slope, it can be kept stopped safely. Accordingly, even when the vehicle comes across a slope, unintended going down the slope of the vehicle can be prevented.

Another embodiment is also directed to a control apparatus for a motor-driven vehicle driven by a motor. The control apparatus includes a vehicle maneuvering section for sensing a manual driving force applied thereto to drive the vehicle and developing a manual-driving-force related signal related in magnitude and direction to the manual driving force applied to the maneuvering section. The control apparatus further includes a control unit for causing the motor to produce a motor driving force having a magnitude and direction as computed from the manual-driving-force related signal. The control unit converts the manual-driving-force related signal into a manual-driving-force representative signal which is zero when no manual driving force is applied to the maneuvering section. The control unit switches the operation mode of the vehicle between a driving mode of operation in which the control unit causes the motor to produce a motor driving force having a magnitude and direction determined by the manual-driving-force representative signal, and a braking mode of operation in which a braking force is produced in response to a braking command. The control unit includes braking force providing means for gradually increasing the braking command from zero when the braking mode is selected. The braking mode is selected when the absolute value of the manual-driving-force representative signal is not greater than a judgment value which is greater than zero, on condition that neither the driving mode nor the braking mode has been selected. The braking force providing means judges whether the manual-driving-force representative signal has changed or not, and determines a change amount by which the braking command is to be changed. The braking force providing means outputs a new braking command prepared from the braking command with the change amount taken into account.

In this embodiment, when the vehicle is in the braking mode, the braking command is increased gradually from zero. In this case, whether to change the braking command or not depends on whether the value of the manual-driving-force representative signal has changed or not. Thus, if the vehicle driver intends to change the mode of operation of the vehicle from, for example, the braking mode to the driving mode and is changing the manual driving force for that purpose, the braking command can be changed to realize what is desired by the vehicle driver.

Another embodiment is also directed to a control apparatus for a motor-driven vehicle driven by motors disposed on opposed sides of the vehicle. The control apparatus includes right and left vehicle maneuvering sections disposed on opposed sides of the vehicle for sensing manual driving forces applied to the right and left vehicle maneuvering sections to drive the vehicle, respectively, and developing respective right and left manual-driving-force related signals related in magnitude and direction to the manual driving forces applied to the respective right and left maneuvering sections. The control apparatus also includes a control unit for causing the motors to produce respective motor driving forces having a magnitude and direction as computed from the manual-driving-force related signals. The control unit converts the right and left manual-driving-force related signals into right and left manual-driving-force representative signals which are zero when no manual driving forces are applied to the maneuvering sections. The control unit switches the operating mode of the vehicle between a driving mode of operation in which the control unit causes the motors to produce respective motor driving forces each having a magnitude and direction determined by associated one of the manual-driving-force representative signals, and a braking mode of operation in which a braking force is produced in response to a braking command. The control unit includes braking force providing means for gradually increasing the braking command from zero when the braking mode is selected. The braking mode is selected when, for example, the absolute values of the right and left manual-driving-force representative signals are not greater than a judgment value which is greater than zero, on condition that neither the driving mode nor the braking mode has been selected. The braking force providing means judges whether the manual-driving-force representative signals have changed or not, determines a change amount by which the braking command is to be changed, and outputs a new braking command prepared from the braking command with the change amount taken into account.

In this embodiment, when both of the manual-driving-force representative signals representing the manual driving forces applied to the right and left maneuvering sections decrease below a judgment value, the braking mode is started, and the braking command gradually increases. Depending on how the right and left manual driving forces change, the braking command increases, decreases or remains unchanged. The vehicle driver changes the right and left manual driving forces in a manner depending on whether the driver intends to maintain the vehicle in the braking mode or to change the mode of operation from the braking mode to the driving mode. In this embodiment, the driver's intention is judged by the manner in which the manual driving forces change, and the braking is controlled to meet the driver's intention.

In another embodiment, the control unit selects the driving mode when, for example, the absolute value of either one of the manual-driving-force representative signals representing the manual driving forces applied to the right and left maneuvering sections is equal to or greater than a reference value which is greater than the judgment value with neither the driving mode nor the braking mode having been selected.

In this embodiment, when, in the braking mode, the right and left manual-driving-force representative signals change, the amount of change by which the braking command is to be changed is adjusted in accordance with the changes of the manual-driving-force representative signals. For example, if the driver intends to change the operating mode from the braking mode to the driving mode, the amount of change by which the braking command is to be changed is varied in a direction to realize the driver's intention. When either of the right and left manual-driving-force representative signals changes to a value above the reference value, the vehicle is placed into the driving mode. This switching of the operating mode is effected rapidly and smoothly without giving any shock to the vehicle because the braking force has been changed to a value suitable for the shift into the driving mode.

In another embodiment, when the braking force providing means judges that neither of the right and left manual-driving-force representative signals has changed, the braking force providing means sets the amount of change by which the braking command is to be changed to a value which increases the braking command.

In this embodiment, it may be judged that the vehicle driver is holding neither of the maneuvering sections if neither of the right and left manual-driving-force representative signals changes. Then, the braking force is increased to secure the vehicle in the braked state.

In another embodiment, the values of the manual-driving-force representative signals are classified into a zero region containing zero and outside regions outside the zero region, and the amount of change by which the braking command is to be changed is determined depending on a combination of the regions in which the respective ones of the right and left manual-driving-force representative signals lie.

In certain cases, even when the right and left manual-driving-force representative signals do not change, it is possible that the maneuvering sections may be held by hand by the vehicle driver. In this embodiment, a different amount of change by which the braking command is to be changed is used depending on which of the zero and outside regions the right and left manual-driving-force representative signals fall in. Thus, the braking of the vehicle appropriate to the manual driving forces applied to the vehicle can be realized.

In another embodiment, the amount of change by which the braking command is to be changed is the largest when both of the right and left manual-driving-force representative signals are in the zero region.

If neither of the two manual-driving-force representative signals changes and both of them are in the zero region, which means that the vehicle is kept in a state in which substantially no manual driving forces are being applied to the right and left vehicle maneuvering sections, it may be judges that the vehicle driver is keeping off his hands from the maneuvering sections. In such a case, according to the above embodiment, the amount by which the braking command is to be changed has a maximum value so as to securely keep the vehicle in the braked state.

In another embodiment, when both of the right and left manual-driving-force representative signals are judged to have changed, the braking force providing means sets the amount of change by which the braking command is to be changed to a value which decreases the braking command or to a value which is equal to zero.

It may be judged that vehicle driver is holding the right and left maneuvering sections if both of the right and left manual driving forces are changing. In this embodiment, the braking force is, at least, not increased so that the current value is held, or the braking force is decreased from the current value, whereby abrupt application of motor driving forces to the vehicle can be prevented when the operating mode changes from the braking mode to the driving mode, and, therefore, no shock can be applied to the vehicle, which, in turn, can prevent the manual driving forces from being unstable.

In another embodiment, the values of the manual-driving-force representative signals are classified into a zero region containing zero and outside regions outside the zero region, and the braking force providing means sets the amount of change by which the braking command is to be changed to zero which causes the braking command to hold the current value when both of the right and left manual-driving-force representative signals lie in the zero region.

Even when both of the right and left manual-driving-force representative signals are changing, if they are changing in the zero region, it is impossible to judge whether such changes have been caused by the vehicle driver who may hold the maneuvering sections or by some external causes. In such a case, according to the above embodiment, the amount by which the braking command is to be changed is kept zero to thereby keep the current braking force.

In another embodiment, the values of the manual-driving-force representative signals are classified into a zero region containing zero and outside regions outside the zero region, and, when one of the manual-driving-force representative signals is judged to have changed, while the other is judged not to have changed, the braking force providing means sets the amount by which the braking command is to be changed to such a value as to increase the braking command, to zero for causing the braking command to hold the current value, or to such a value as to decrease the braking command, depending on a combination of the regions in which the manual driving forces lie.

If one of the right and left manual-driving-force representative signals is changing with the other unchanged, and they are in the zero or outside regions, it can be judged either that the vehicle driver is holding the maneuvering sections by hand or that the vehicle driver is not holding the maneuvering section and the change of the one manual-driving-force representative signal is due to external causes, such as vibrations of the vehicle. In such a case, therefore, according to the above embodiment, in order to increase, decrease or keep the current value of the braking command depending on which regions the respective manual-driving-force representative signals are in, the amount by which the braking command is to be changed is set to be an increment, a decrement or a zero value.

In another embodiment the braking force providing means sets the amount by which the braking command is to be changed to such a value as to increase the braking command when both of the right and left manual-driving-force representative signals are judged to lie in the zero region.

When one of the manual-driving-force representative signals is changing, while the other remaining- unchanged, with both manual-driving-force representative signals being in the zero region, it is better to take actions, assuming that the maneuvering sections are not held by the vehicle driver, in order to secure the safety of the vehicle. In such a case, according to the above embodiment, the amount by which the braking force is to be changed is increased to thereby increase the braking force.

In another embodiment, the braking force providing means sets the amount of change by which the braking command is to be changed to zero when one of the manual-driving-force representative signals is judged to lie in the zero region with the other lying in the outside region.

When one of the right and left manual-driving-force representative signals is changing in the zero region, while the other is not changing and falls in the outside region, it cannot be determined whether the vehicle driver is holding the maneuvering sections or not. In such a case, according to the above embodiment, the braking command is neither increased nor decreased, but the current braking state is maintained.

In another embodiment, the braking force providing means sets the amount by which the braking command is to be changed to such a value as to decrease the braking command when both of the right and left manual-driving-force representative signals are judged to be in the outside region.

When one of the manual driving force is changing, while the other is not changing, and both are in the outside region, it may be justified to consider that the maneuvering sections are held by hand. In this embodiment, the amount of change by which the braking command is to be changed is decreased to reduce the braking force so that no shock is provided to the vehicle when the operating mode is switched to the driving mode.

Another embodiment is also directed to a control apparatus for a motor-driven vehicle driven by motors disposed on opposed sides of the vehicle. The control apparatus includes right and left vehicle maneuvering sections disposed on opposed sides of the vehicle for sensing manual driving forces applied to the right and left maneuvering sections to drive the vehicle and developing respective right and left manual-driving-force related signals related in magnitude and direction to the manual driving forces applied to the respective maneuvering sections. The control apparatus further includes a control unit for causing the motors to produce respective right and left motor driving forces having a magnitude and direction as computed from the manual-driving-force related signals. The control unit converts the right and left manual-driving-force related signals into right and left manual-driving-force representative signals which are zero when no manual driving forces are being applied to the maneuvering sections. The control unit switches the operating mode of the vehicle between a driving mode of operation in which the control unit causes the motors to produce respective motor driving forces each having a magnitude and direction determined by associated one of the manual-driving-force representative signals, and a braking mode of operation in which a braking force is produced in response to a braking command. The control unit includes braking force providing means for gradually increasing the braking command from zero when the braking mode is selected. The braking mode is selected when, for example, the absolute values of the right and left manual-driving-force representative signals are not greater than a judgment value which is greater than zero, on condition that neither the driving mode nor the braking mode has been selected. The values of the manual-driving-force representative signals are classified into a zero region containing zero and outside regions outside the zero region, and the braking force providing means selects an appropriate amount of change by which the braking command is to be change, depending on a combination of the regions in which the right and left manual-driving-force representative signals lie, and outputs a new braking command prepared from the braking command with the selected amount of change taken into account.

In this embodiment, even when the manual-driving-force representative signals are below the judgment value, it is tried to determine whether a vehicle driver is holding the maneuvering sections or has stopped applying manual driving forces to them, and the amount of change for the braking command is increased, decreased or made zero depending on which regions the two manual-driving-force representative signals are in.

In another embodiment, the amount of change by which the braking command is to be changed is the largest when both of the right and left manual-driving-force representative signals are lying in the zero region and the smallest when both of the right and left manual-driving-force representative signals are lying in the outside region.

When both right and left manual-driving-force representative signals are in the zero region, it may be justified to consider that the vehicle driver has stopped applying manual driving forces to the maneuvering sections. In such a case, according to the above embodiment, the amount of change by which the braking force is to be changed is increased in order to provide a larger braking force. In contrast, if both manual-driving-force representative signals are in the outside region, it may be justified to consider that the vehicle driver intends to apply manual driving forces to the maneuvering sections. In such a case, the amount of change by which the braking command is to be changed is made minimum.

Another embodiment is also directed to a control apparatus for a motor-driven vehicle driven by a motor. The control apparatus includes a vehicle maneuvering section for producing an electric signal for driving the vehicle, and a control unit for causing the motor to produce a motor driving force having a magnitude and direction corresponding to the electric signal for driving the vehicle. The control unit includes braking force providing means for gradually increasing a braking force from zero so that the speed of the vehicle decreases to a predetermined reference value when the control unit judges that the manipulation of the maneuvering section has been discontinued.

In this embodiment, when the vehicle driver stops manipulation of the maneuvering section, the vehicle speed is gradually decreased down to a predetermined reference speed without giving a shock to the vehicle.

Another embodiment is also directed to a control apparatus for a motor-driven vehicle driven by a motor. The control apparatus includes a vehicle maneuvering section which senses a manual driving force applied thereto to drive the vehicle and develops a manual-driving-force related signal related in magnitude and direction to the manual driving force applied to the maneuvering section, and a control unit for causing the motor to produce a motor driving force having a magnitude and direction determined by the manual-driving-force related signal. The control unit includes braking force providing means for gradually increasing a braking command from zero which causes the motor to produce a braking force for decreasing the speed of the vehicle to a predetermined reference value when the control unit judges that the manual driving force has been removed.

In this embodiment, when a manual driving force has been removed from the maneuvering section, the braking command which causes the motor to generate a braking force increases gradually from zero, and, therefore, it never occurs that a shock is abruptly applied to the vehicle when the vehicle speed is being reduced.

In another embodiment, the braking force providing means gradually decreases the braking command after the vehicle attains the reference speed.

According to the above embodiment, the braking command is gradually decreased once the vehicle speed reaches the reference speed, and, therefore, the vehicle speed is never reduced to a speed largely different from the reference speed.

Another embodiment is also directed to a control apparatus for a motor-driven vehicle driven by a motor. The control apparatus includes a vehicle maneuvering section which senses a manual driving force applied thereto to drive the vehicle and develops a manual-driving-force related signal related in magnitude and direction to the manual driving force applied to the maneuvering section, and a control unit for causing the motor to produce a motor driving force having a magnitude and direction determined by the manual-driving-force related signal. The control unit includes braking force providing means for gradually increasing a braking command from zero to cause the motor to produce a braking force in an abnormal condition of the vehicle judged by the control unit when the manual-driving-force related signal has not changed for a predetermined time period.

Occurrence of no change in the manual-driving-force representative signal for a long period may be interpreted as abnormal operation of, for example, the maneuvering section. In such a case, according to the above embodiment, the braking force providing means increases the braking force gradually from zero to brake the vehicle for securing the safety of the vehicle.

BRIEF DESCRIPTION OF THE DRAWINGS

FIG. 12 shows a table for use in determining the compensation factors in the driving mode of the motor-driven wheelchair.

FIG. 17 is a table for use in the braking mode as illustrated in FIG. 16.

FIG. 20 shows a relationship between the manual-driving-force representative signals and the upper limit value of the braking command for the braking mode as illustrated in FIG. 19.

DETAILED DESCRIPTION OF THE INVENTION

Mechanical Arrangement of Motor-Driven Wheelchair

The present invention is embodied in a motor-driven vehicle, such as a motor-driven wheelchair, by way of example.

Figure 1:
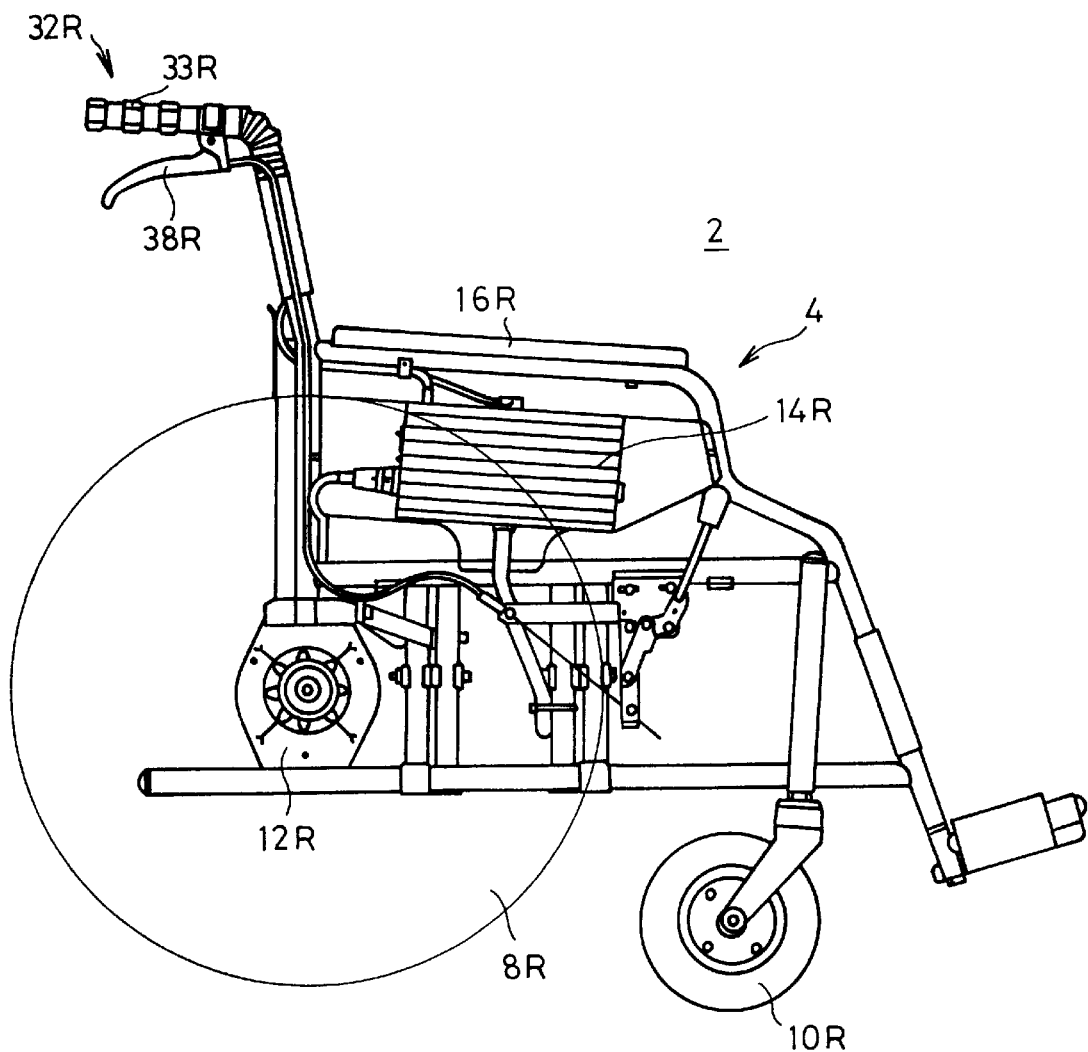
FIG. 1 is a side view of a motor-driven wheelchair including a control apparatus according to the present invention.
Figure 2:
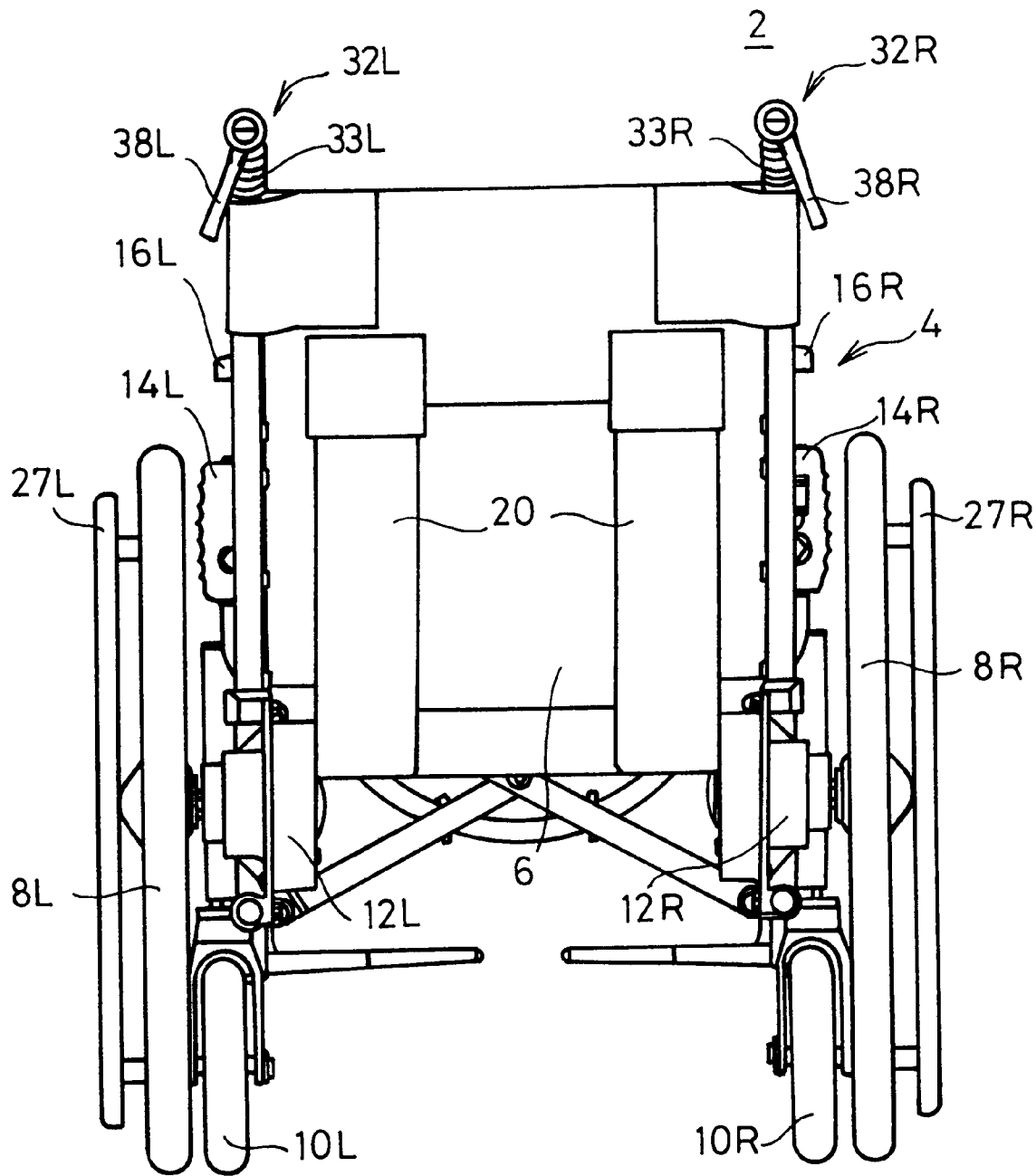
FIG. 2 is a rear view of the motor-driven wheelchair of FIG. 1.

As shown in FIGS. 1 and 2, a motor-driven wheelchair 2 includes a vehicle body 4 which is a framework formed of pipes. A seat of cloth 6 on which a wheelchair user can sit is stretched over the space between the sides of the framework of the body 4, as shown in FIG. 2. In the rear part of the body 4, drive wheels 8R and 8L are rotatably mounted on opposing right and left sides of the body 4, respectively. (In this specification, the letter "R" or "r" denotes "right" and the letter "L" or "l" denotes "left". Accordingly, any reference numerals and letters with "R" or "r" attached at the end thereof are for components or functions relating directly or indirectly to the right-hand side drive wheel 8R, while any reference numerals and letters with "L" or "l" attached at the end thereof are for components or functions relating directly or indirectly to the left-hand side drive wheel 8L.) Auxiliary wheels 10R and 10L are mounted to the opposing sides of the front part of the body 4. In order to illustrate the structure of the body 4 clearly, the driving wheel 8R is drawn by a thin line in FIG. 1.

Driving units, e.g. electric motors 12R and 12L, for driving the drive wheels 8R and 8L are mounted on the vehicle body 4 on its opposite sides. The motors 12R and 12L are coupled to the drive wheels 8R and 8L, respectively. (Instead of mounting the motors 12R and 12L on the vehicle body 4, they may be disposed in the wheels 8R and 8L.) Controllers 14R and 14L for controlling the motors 12R and 12L, respectively, are mounted on the vehicle body 4. The controller 14R is disposed below a right-hand side arm rest 16R, and the controller 14L is located below a left-hand side arm rest 16L. Batteries 18R and 18L from which the controllers 14R and 14L and the motors 12R and 12L are powered are disposed in hollows formed in the arm rests 16R and 16L or in two pockets 20 in the back of the seat 6.

Electric Circuitry of Motor-Driven Vehicle

Figure 4:
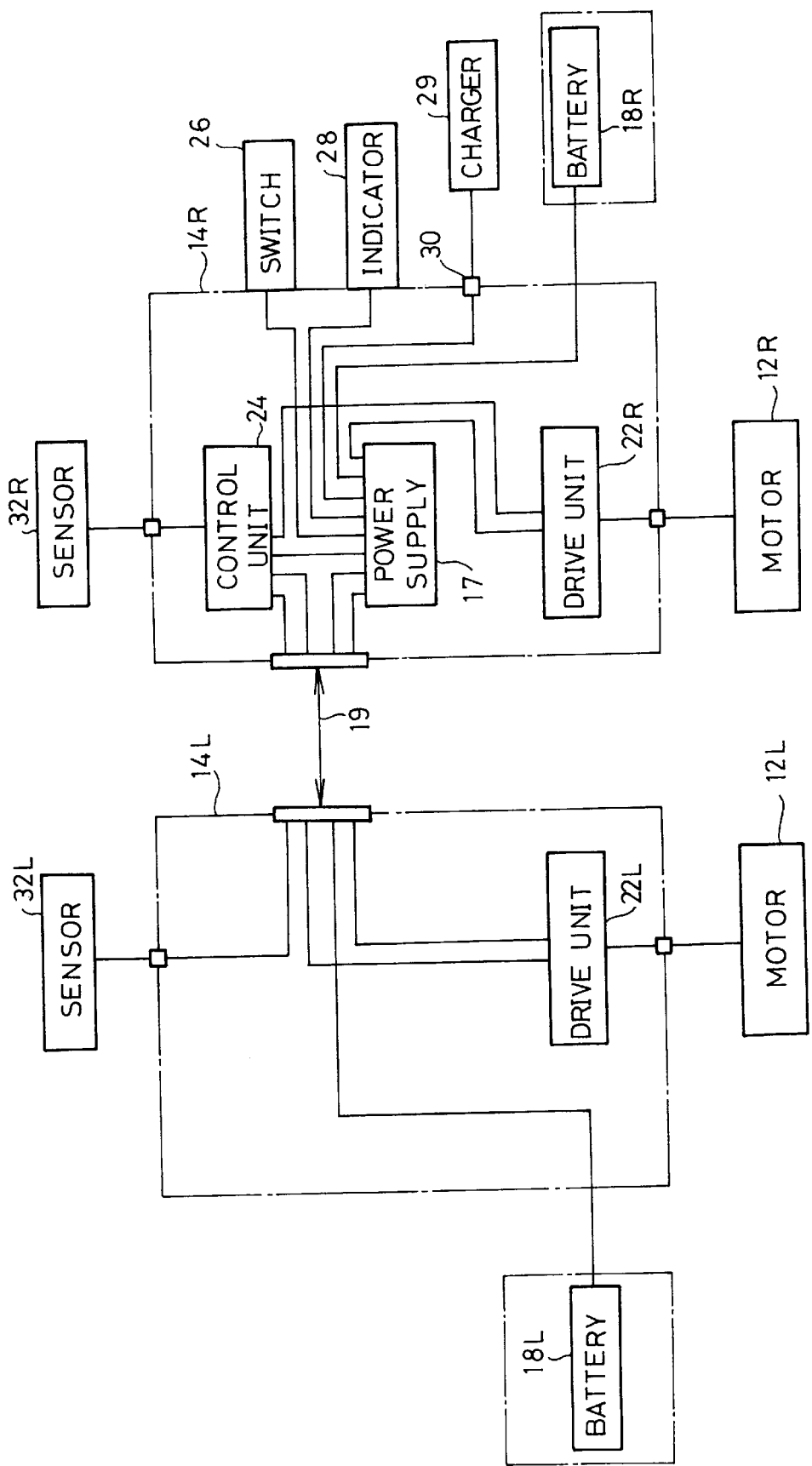
FIG. 4 is a block circuit diagram of an electrical part of the motor-driven wheelchair of FIG. 1.

As shown in FIG. 4, the controller 14R includes a power supply circuit 17, which is fed with a DC voltage from the battery 18R and also fed with a DC voltage from the battery 18L through the controller 14L and a transmission cable 19. The power supply circuit 17 converts the supplied DC voltages into voltages suitable for operating drive units 22R and 22L and into DC voltages suitable for operating a control unit, e.g. control circuit 24.

The drive unit 22R is included in the controller 14R, and the drive unit 22L is included in the controller 14L. The drive units 22R and 22L include bridge circuits formed of semiconductor switching devices, for example, which are supplied with a DC voltage from the power supply circuit 17. The semiconductor switching devices are supplied with a pulse width controlled (PWM) signal from the control circuit 24 in the controller 14R. The PWM signal modifies the average value of the DC voltages supplied to the drive circuits, and the motors 12R and 12L are driven in accordance with the average-value-modified DC voltages. The semiconductor switching devices also operate to interrupt the supply of the DC voltages while the motors 12R and 12L are rotating, and alternatively short-circuits and open-circuits the motors 12R and 12L for the dynamic braking of the drive wheels 8R and 8L.

The controller 14R also includes a switch 26 for use in activating the control circuit 24 and other circuits, and an indicator lamp 28 indicating when the control circuit 24 is operating. The controller 14R also includes terminals 30 for connection to a charger 29 for charging the batteries 18R and 18L.

The control unit 24 may include a microprocessor, which receives signals from manual-driving-force sensing units 32R and 32L, which signals are related to the manual driving forces applied to handlebars 33R and 33L of the manual-driving-force sensing units 32R and 32L. As shown in FIGS. 1 and 2, the handlebars 33R and 33L extend in parallel backward from the opposite sides of the rear part of the vehicle body 4. The manual-driving-force sensing units 32R and 32L sense independently the manual driving forces applied to the handlebars 33R and 33L by the attendant for the wheelchair user, and develop the manual-driving-force related signals which are related to the respective manual driving forces as detected by the sensing units 32R and 32L.

The manual driving force applied to the manual-driving-force sensing unit 32R is transmitted to the drive wheel 8R through the vehicle body 4 so that the drive wheel 8R is driven to rotate, and the manual driving force applied to the manual-driving-force sensing unit 32L is transmitted to the drive wheel 8L through the vehicle body 4 so that the drive wheel 8L is driven to rotate.

Each of the manual-driving-force sensing units 32R and 32L may include a potentiometer. The value of a signal provided by the potentiometer changes according to the amount of displacement of the corresponding handlebar 33R or 33L in the forward or rearward direction from its neutral position (i.e. the position the handlebar assumes when no manual driving force is applied to it). This amount of displacement is dependent on the magnitude of the manual driving force applied to that handlebar. The change of the signal value is sensed, and a manual driving force related signal is developed.

In place of potentiometers, bridge circuits including strain gauges may be used.

Figure 5:
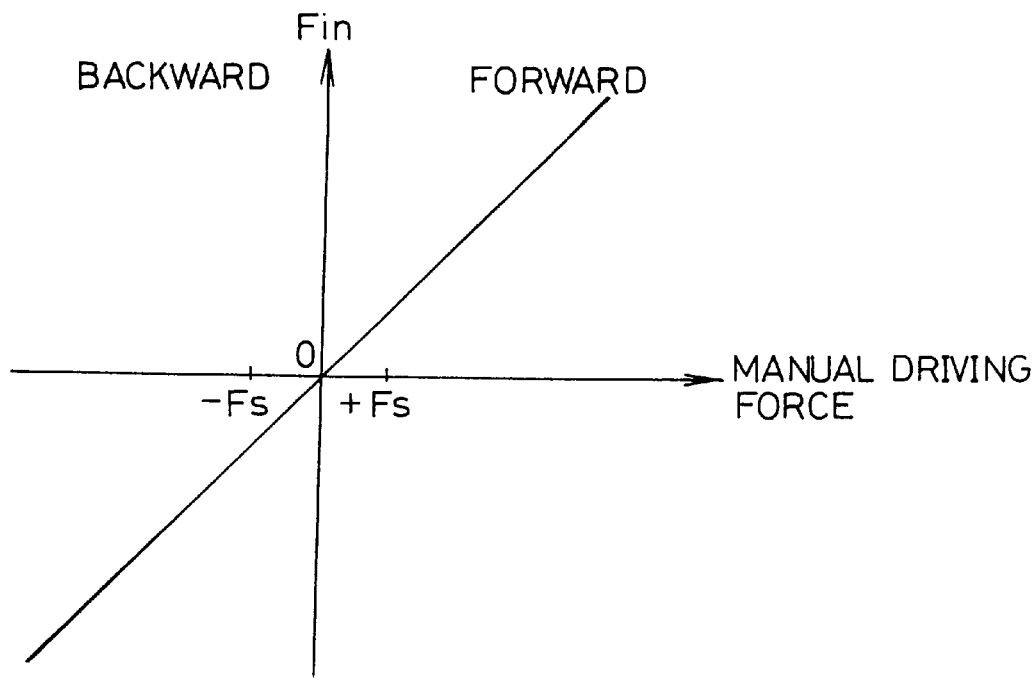
FIG. 5 shows a relationship between a manual driving force and a manual-driving-force representative signal.

The manual-driving-force related signals from the manual-driving-force sensing units 32R and 32L are at a predetermined voltage when no manual driving force is applied to the handlebars. When manual driving forces tending to drive the motor-driven wheelchair forward (hereinafter referred to as forward manual driving forces) are applied to the handlebars 33R and 33L, the voltage values of the respective manual-driving-force related signals rise from the predetermined voltage by amounts determined by the magnitudes of the manual driving forces applied to the handlebars. If manual driving forces tending to drive the wheelchair backward (hereinafter referred to as backward manual driving forces) are applied to the handlebars 33R and 33L, the voltage values of the respective manual-driving-force related signals fall from the predetermined voltage by amounts determined by the magnitudes of the manual driving forces applied to the handlebars. The manual-driving-force related signals are applied to the control unit 24, where the above-stated predetermined voltage value is subtracted from the manual-driving-force related signals, and are converted into manual-driving-force representative signals FinR and FinL, shown in FIG. 5. The manual-driving-force representative signals FinR and FinL are zero when no manual driving forces are applied, assume positive values when forward manual driving forces are applied, and assume negative values when backward manual driving forces are applied to the handlebars 33R and 33L.

In place of the described and illustrated manual-driving-force sensing units, manual-driving-force sensing means may be mounted on or in hand rims 36R and 36L secured to the drive wheels 8R and 8L, respectively, for independently detecting the manual driving forces the wheelchair user applies to the hand rims 36R and 36L.

The motor-driven wheelchair includes mechanical brakes which are operated through grips 38R and 38L attached to the lower parts of the handlebars 33R and 33L.

Processing Performed in Control Circuit

The control circuit 24 executes one of operating modes, namely, the driving mode, the braking mode, an OFF mode and an abnormality mode of operation. The driving mode is a mode in which the motors 12R and 12L are driven to drive the wheelchair in response to manual driving forces applied to the wheelchair. The braking mode is a mode in which the motors 12R and 12L are braked when manual driving forces are removed. The OFF mode is a mode in which the motors 12R and 12L are left to rotate through inertia during the transition from the driving mode to the braking mode or from the braking mode to the driving mode. The abnormality mode is a mode in which the motors 12R and 12L are stopped when the wheelchair becomes abnormal or out of order.

In the driving mode, the control circuit 24 computes right and left actual motor driving signals FoutR and FoutL for use in driving the motors 12R and 12L. The signal FoutR and FoutL are converted into PWM signals and applied to the motors 12R and 12L to drive them, as will be described in detail later. The control circuit 24 computes braking commands Brk for use in dynamic braking of the motors 12R and 12L in the braking and abnormality modes of operation.

Main Routine

Figure 6:
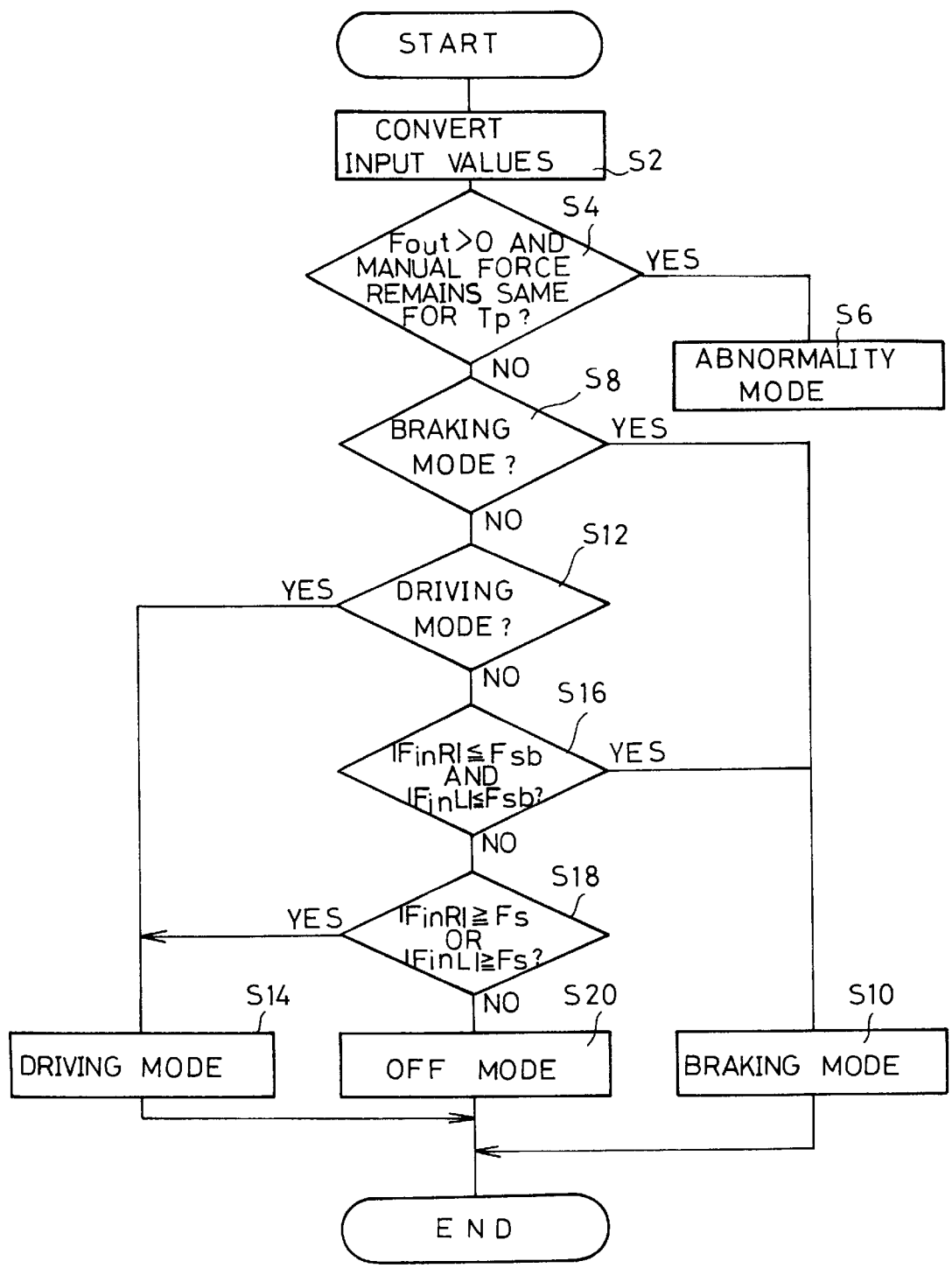
FIG. 6 is a main flow chart illustrating the control of the motor-driven wheelchair.

FIG. 6 shows a main routine of the processing executed by the control circuit 24. The main routine is executed at predetermined sampling intervals, e.g. every $\frac{1}{100}$ second. In the main routine, the control circuit 24 converts input values (Step S2). Specifically, the manual-driving-force representative signals FinR and FinL representative of the manual driving forces applied to the manual-driving-force sensing units 32R and 32L, respectively, are prepared from the manual-driving-force related signals produced by the manual-driving-force sensing units 32R and 32L.

The control circuit 24 makes a judgment as to whether both of the current actual motor driving signals FoutR and FoutL are greater than zero and both of the manual-driving-force representative signals FinR and FinL have not changed for a predetermined time Tp (Step S4). In other words, a judgment is made as to whether the manual driving forces have not been changed for the predetermined time Tp while the motors 12R and 12L are being driven. The answer YES to the question made in Step S4 may means that the manual-driving-force sensing units 32R and 32L or some other components of the vehicle have failed to normally operate. Accordingly, the later-mentioned abnormality mode of operation is executed (Step S6).

If the answer to the inquiry made in Step S4 is NO, whether the execution of the braking mode has been started or not is made (Step S8). If the answer to Step S8 is YES, the execution of the braking mode is continued (Step S10).

On the other hand, if the answer to Step S12 is NO, a judgment is made as to whether the execution of the driving mode has started or not (Step S12). If the answer to the inquiry made in Step S8 is YES, the execution of the driving mode is continued (Step S14).

The judgment as to whether the driving mode or braking mode is being executed or not may be made by finding whether a driving mode flag for the driving mode or a braking mode flag for the braking mode is set or not in a memory in the control circuit 24. These flags are set when the execution of the corresponding modes of operation is started, and reset when the execution is ended.

If the answer to Step S12 is NO, a judgment is made as to if the absolute values of both of the manual-driving-force representative signals FinR and FinL are equal to or smaller (i.e. not greater) than a later-mentioned judgment value (Step S16). If the answer to this Step S16 is YES, the braking mode is executed in Step S10.

If the answer to Step S16 is NO, a judgment is made as to whether or not the absolute value of the manual-driving-force representative signal FinR is equal to or greater (i.e. not smaller) than a later-mentioned reference value Fs or whether or not the absolute value of the manual-driving-force representative signal FinL is equal to or greater than the reference value Fs (Step S18). If the answer to Step S18 is YES, the driving mode of Step S14 is executed. On the other hand, if the answer to Step S18 is NO, the OFF mode of Step S20 is executed (Step S22).

Figure 7:
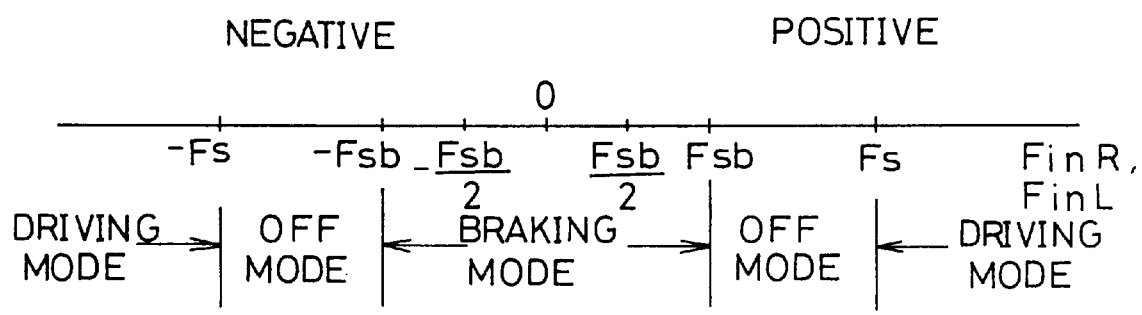
FIG. 7 shows a relationship between the manual-driving-force representative signal and operating modes of the motor-driven wheelchair.

FIG. 7 illustrates a relationship among a judgment value Fsb, a reference value Fs and the modes of operation. As will be understood from the illustration in FIG. 7, the judgment made in Step S16 is a judgment as to whether both of FinR and FinL are within a range of ±Fsb, and the braking mode is carried out if both of them are within the range of ±Fsb. The judgment made in Step S18 is a judgment as to whether either of the manual-driving-force representative signals FinR and FinL is above the positive reference value +Fs or below the negative reference value −Fs. If either of FinR or FinL is above +Fs or below −Fs, the driving mode is executed.

The OFF mode is performed if either one of the manual-driving-force representative signals FinR and FinL is within the range of ±Fsb and the other is between Fsb and Fs or between −Fsb and −Fs, or if both FinR and FinL are between Fsb and Fs or between −Fsb and −Fs.

As shown in FIG. 7, the absolute value of the reference value Fs is larger than the absolute value of the judgment value Fsb. The absolute value of the judgment value Fsb is set to the value of the manual-driving-force representative signal which would be developed due to error in the manual-driving-force sensing unit 32R or 32L or for some other reasons when no manual driving force is applied to either of the manual-driving-force sensing units 32R and 32L.

Driving Mode

Each time the driving mode is performed, the amount of change from the previous value, dFa-r or dFa-l, of each of preliminary motor driving signals Fa-r and Fa-l for the motors 12R and 12L, respectively, is computed, using the difference between the manual-driving-force representative signal FinR or FinL and the reference value Fs. (Hereinafter, dFa-r and dFa-l may be referred to as change amount.) A compensated change amount dFa-rw for the motor 12R by which the current preliminary motor driving signal Fa-r(t−1) for the motor 12R is to be change to form a new preliminary motor driving signal Fa-r(t) is computed from dFa-r with dFa-l taken into account. Similarly, a compensated change amount dFa-lw for the motor 12L by which the current preliminary motor driving signal Fa-l(t−1) is to be changed to form a new preliminary motor driving signal Fa-l(t) is computed from dFa-l with dFa-r taken into account. The compensated change amount dFa-rw is added to the current preliminary motor driving signal Fa-r(t−1), resulting in the new preliminary motor driving signal Fa-r(t). The compensated change amount dFa-lw is added to the current preliminary motor driving signal Fa-l(t−1), resulting in the new preliminary motor driving signal Fa-l(t).

Figure 8:
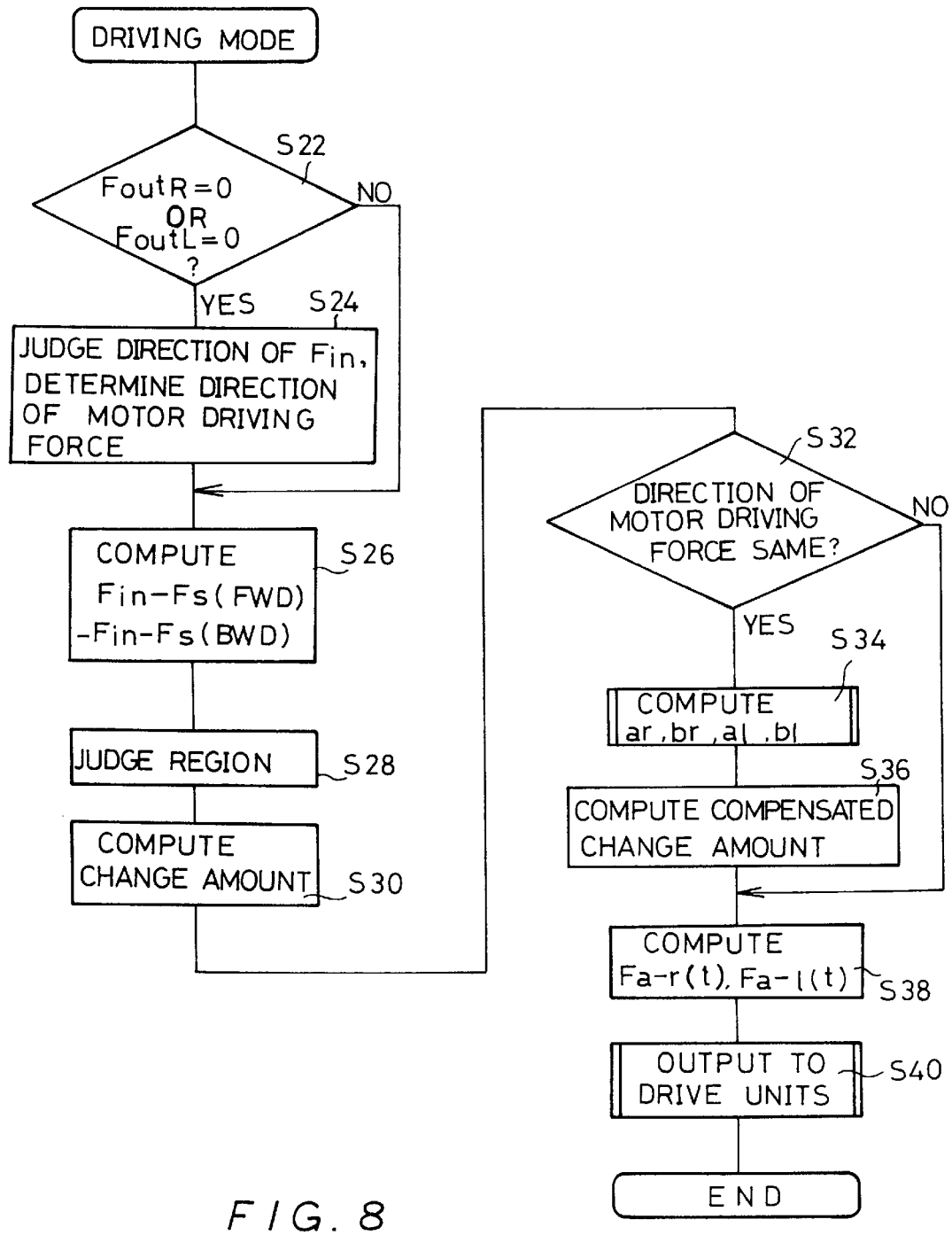
FIG. 8 shows a flow chart of a driving mode of operation of the motor-driven wheelchair.

For achieving the driving mode, whether the current right or left actual motor driving signal FoutR or FoutL is zero or not is judged in Step S22, as shown in FIG. 8. The actual motor driving signal FoutR which is equal to zero means that the motor-driven wheelchair is not being driven by the motor 12R. Then, the sign (i.e. direction) of the manual-driving-force representative signal FinR is judged in Step S24 to determine the direction in which the motor 12R is to be rotated. If the actual motor driving signal FoutL is judged to be zero in Step S22, which means that the motor-driven wheelchair is not being driven by the motor 12L, the sign of the manual-driving-force representative signal FinL is judged in Step S24 for determining the direction in which the motor 12L is to be rotated.

If it is judged in Step S22 that FoutR is not zero, the direction in which the motor 12R is to be rotated is known, and, therefore, Step S24 for determining the direction of rotation is not executed. Similarly, if FoutL is judged not to be zero, the direction in which the motor 12L is to be rotated is known. Therefore Step S24 is not executed.

Next, the difference between each of the manual-driving-force representative signals FinR and FinL and the reference value Fs is computed (Step S26). It should be noted that if the direction in which the motor 12R, for example, is to be rotated has been judged to be the forward direction, i.e. the direction for driving the wheelchair forward, the reference value Fs is subtracted from FinR.

On the other hand, if the direction in which the motor 12R is to be rotated has been judged to be the reverse direction, i.e. the direction for driving the wheelchair backward, Fs is subtracted from −FinR.

The same processing is carried out for the motor 12L, too.

Figure 9:
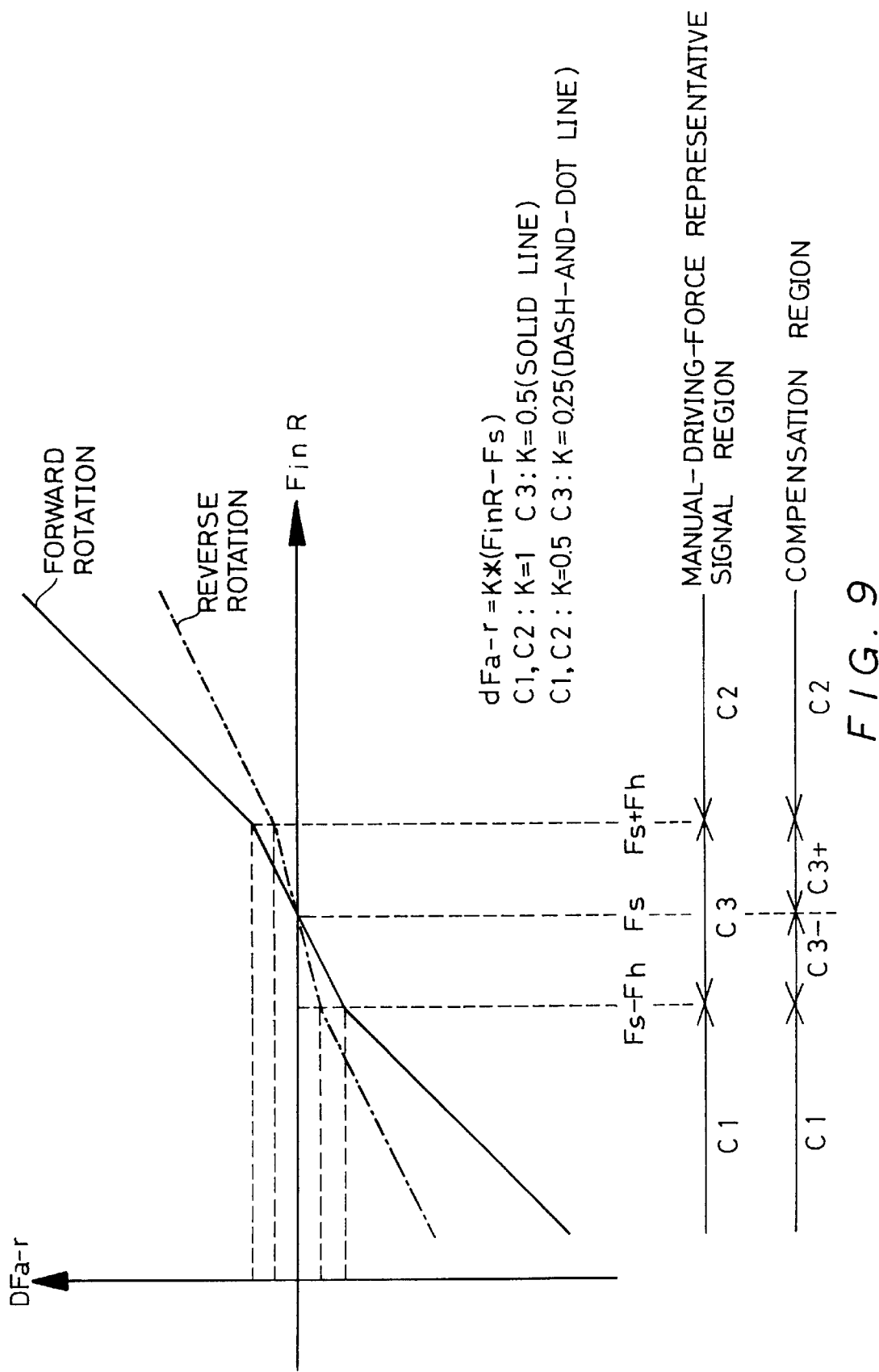
FIG. 9 shows a relationship between the manual-driving-force representative signal and the amount of change of the manual driving force.

Next, a judgment is made in which manual-driving-force representative signal regions C1, C2 and C3 shown in FIG. 9 the manual-driving-force representative signal FinR lies, and also a judgment is made in which manual-driving-force representative signal regions C1, C2 and C3 the manual-driving-force representative signal FinL lies (Step S28). The region C1 is a region for the manual-driving-force representative signal values equal to or greater than a threshold value Fs−Fh, and the region C2 is a region for the manual-driving-force representative signal values equal to or smaller than a threshold value Fs+Fh. When FinR is in either of the regions C1 and C2, the change amount of the preliminary motor driving force, dFa-r, is computed with a later-mentioned factor K which is equal to unity (1) when the motor 12R is rotating forward and equal to 0.5 when the motor 12R is rotating in the reverse direction. Similar to FinR, when FinL is in either of the regions C1 and C2, the change amount of the preliminary motor driving force, dFa-l, is computed with a later-mentioned factor K which is equal to unity (1) when the motor 12L is rotating forward and equal to 0.5 when the motor 12L is rotating in the reverse direction.

The region C3 is a region extending between the thresholds Fs−Fh and Fs+Fh. For FinR in this region, the factor K equal to 0.5 is used when the motor 12R is rotating in the forward direction, and the factor K equal to 0.25 is used when the motor 12R is rotating in the reverse direction. Similarly, for FinL in this region, the factor K equal to 0.5 is used when the motor 12L is rotating in the forward direction, and the factor K equal to 0.25 is used when the motor 12L is rotating in the reverse direction.

Figure 10:
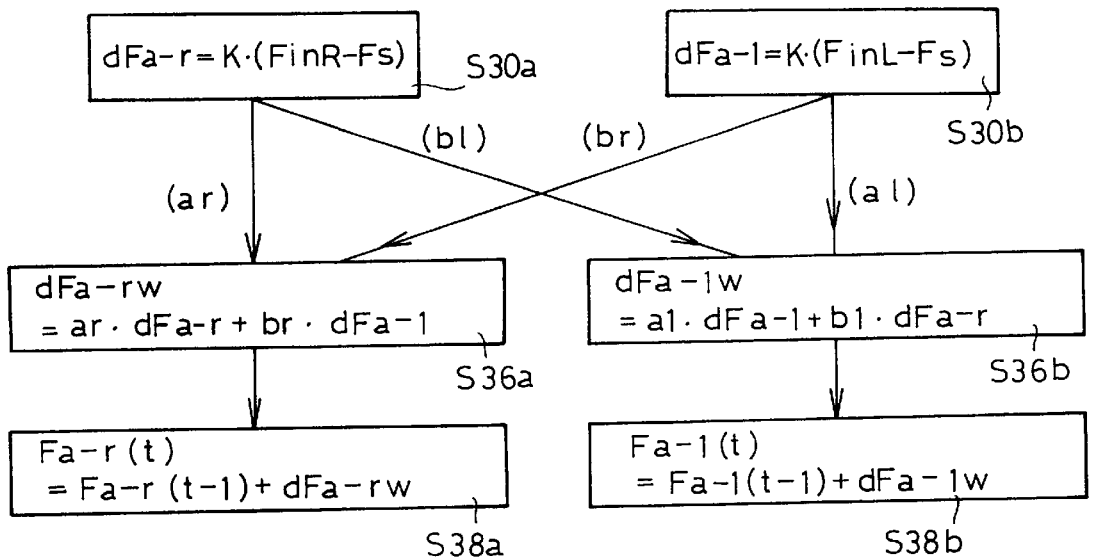
FIG. 10 is a flow chart illustrating how to determine the driving force in the driving mode of the motor-driven wheelchair.

Next, the respective change amounts of the preliminary motor driving signals, dFa-r and dFa-l, are computed (Step S30). As shown in FIG. 10, the change amount dFa-r is computed by a formula K*(FinR−Fs) (Step S30a), and the change amount dFa-l is computed by a formula K*(FinL−Fs) (Step S30b).

Then, whether the current directions of the motor driving forces provided by the motors 12R and 12L are same or not is judged (Step S32). if the answer to Step S32 is YES, which means the wheelchair is moving forward or backward, compensation factors ar, al, br and bl which are used in computing the compensated change amounts dFa-rw and dFa-lw Step S34) are computed.

These compensation factors ar, al, br and bl are used together with the change amounts dFa-r and dFa-l to compute the compensated change mounts dFa-rw and dFa-lw (Step S36). As shown in FIG. 10, dFa-rw is computed by an expression ar*dFa-r+br*dFa-l (Step S36a), while dFa-lw is computed by an expression al*dFa-l+bl*dFa-r (Step S36b).

Figure 11:
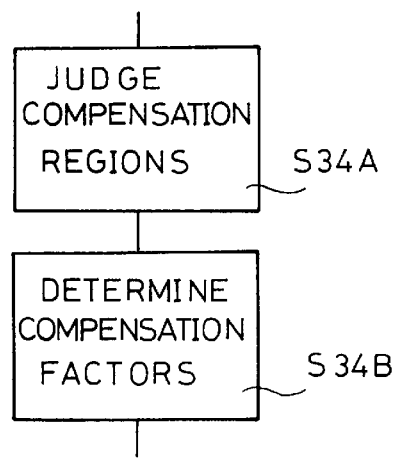
FIG. 11 is a flow chart illustrating how to determine compensation factors in the driving mode of the motor-driven wheelchair.

The computation of the compensation factors in Step S34 is done as shown in FIG. 11. First, in which one of compensation regions C1, C2, C3– and C3+ shown in FIG. 9 each of FinR and FinL lies is judged (Step S34A). The compensation region C1 is a region below a threshold value Fs–Fh, the compensation region C2 is a region above a threshold value Fs+Fh, the compensation region C3– is a region between Fs–Fh and 0, and the region C3+ is between 0 and Fs+Fh. The compensation regions may be defined, using other threshold values than Fs–Fh and Fs+Fh.

On the basis of the compensation regions in which FinR and FinL have been judged to fall, compensation factors ar, br, al and bl are determined (Step S34B). The determination may be carried out, using a table which the control circuit 24 includes. One example of such table is shown in FIG. 12.

All of the compensation factors ar, br, al and bl are 0.5 when both FinR and FinL are in the region C1, C3–, C3+ or C2, or, in other words, when the magnitudes and directions of FinR and FinL are substantially equal. Then, the compensated change amount dFa-rw is 0.5 dFa-r+0.5 dFa-l, and the compensated change amount dFa-lw is 0.5 dFa-l+0.5 dFa-r. These compensated change amounts are useful in driving the wheelchair straight forward.

When FinR is in the compensation region C3+ and FinL is in C1, when FinR is in C2 and FinL is in C3–, when FinR is C1 and FinL is in C3+, or when FinR is in C3– and FinL is in C2, i.e. when there is some difference both in magnitude and direction between FinR and FinL, the compensation factors ar, br, al and bl are 0.8, 0.2, 0.8 and 0.2, respectively. Then, the compensated change amount dfa-rw is equal to 0.8 dFa-r+0.2 dFa-l, and the compensated change amount dFa-lw is equal to 0.8 dFa-l+0.2 dFa-r. These values are useful in rotating the wheelchair with the same direction of rotation of the motors 12R and 12L kept.

When FinR is in C3– and FinL is in C1, when FinR is in C1 and FinL is in C3–, when FinR is in C2 and FinL is in C3+, or when FinR is in C3+ and FinL is in C2, i.e. when there is some difference in magnitude between the right and left manual-driving-force representative signals FinR and FinL, but they are in the same direction, the compensation factors ar, br, al and bl which are equal to 0.6, 0.4, 0.6 and 0.4, respectively, are used. Thus, the compensated change amount dFa-rw is equal to 0.6 dFa-r+0.4 dFa-l and the compensated change amount dFa-lw is equal to 0.6 dFa-l+ 0.4 dFa-r. These compensated change amounts are used in driving the wheelchair straight forward.

When FinR is in C1 and FinL is in C2, or when the FinR is in C2 and FinL is in C1, i.e. when the right and left manual-driving-force representative signals FinR and FinL have relatively large magnitudes but differ in direction, the compensation factor ar equal to 1.0, br equal to 0, al equal to 1.0 and bl equal to 0 are used. Thus, the compensated change amount dFa-rW is equal to dFa-r, and the compensated change amount dFa-lw is equal to dFa-l. These values are useful to rotate the wheelchair in substantially the same location, with the same rotation direction for the motors 12R and 12L kept.

When FinR is in C3+ and FinL is in C3–, i.e. when the right and left manual-driving-force representative signals FinR and FinL have substantially the same magnitude, but they differ in direction, namely, FinR is positive-going, while FinL is negative-going, the compensation factor ar of 1.0, br of 0, al of 0 and bl of 0.5 are used. Thus, the compensated change amount dFa-rw is equal to dFa-r, whereas the compensated change amount dFa-lw is equal to 0.5 dFa-r. In this case, the wheelchair is driven straight forward.

When FinR is in C3– and FinL is in C3+, i.e. when the right and left manual-driving-force representative signals FinR and FinL have substantially the same magnitude, but they differ in direction, namely, FinR is negative-going, while FinL is positive-going, the compensation factor ar of 0, br of 0.5, al of 1.0 and bl of 0 are used. Thus, the compensated change amount dFa-rw is equal to 0.5 dFa-l, whereas the compensated change amount dFa-lw is equal to dFa-l. In this case, too, the wheelchair is driven straight forward.

Now, returning to FIG. 8, after the compensated change amounts are computed, new preliminary motor driving signals Fa-r(t) and Fa-l(t) are computed (Step S38). The new preliminary motor driving signal Fa-r(t) is computed by adding the compensated change amount dFa-rw to the current preliminary motor driving signal Fa-r(t–1) (Step S38a). The new preliminary motor driving signal Fa-l(t) is computed by adding the compensated change amount dFa-lw to the current preliminary motor driving signal Fa-l(t–1) (Step S38b).

Step S38 is also executed when the directions of rotation of the motors 12R and 12L are judged to be different in Step S32, i.e. when Step S32 judges that the wheelchair is being rotated by rotating the motors 12R and 12L in opposite directions, because when the wheelchair is rotated, it is not necessary to compute compensated change amounts, which are used essentially for improving the wheelchair drivability in the straight-forward direction. In this case, the change amounts dFa-r and dFa-l computed in Step S30 are added respectively to the current preliminary motor driving signals Fa-r(t–1) and Fa-l(t–1), which results in the development of the new preliminary motor driving signals Fa-r(t) and Fa-l (t).

Figure 13:
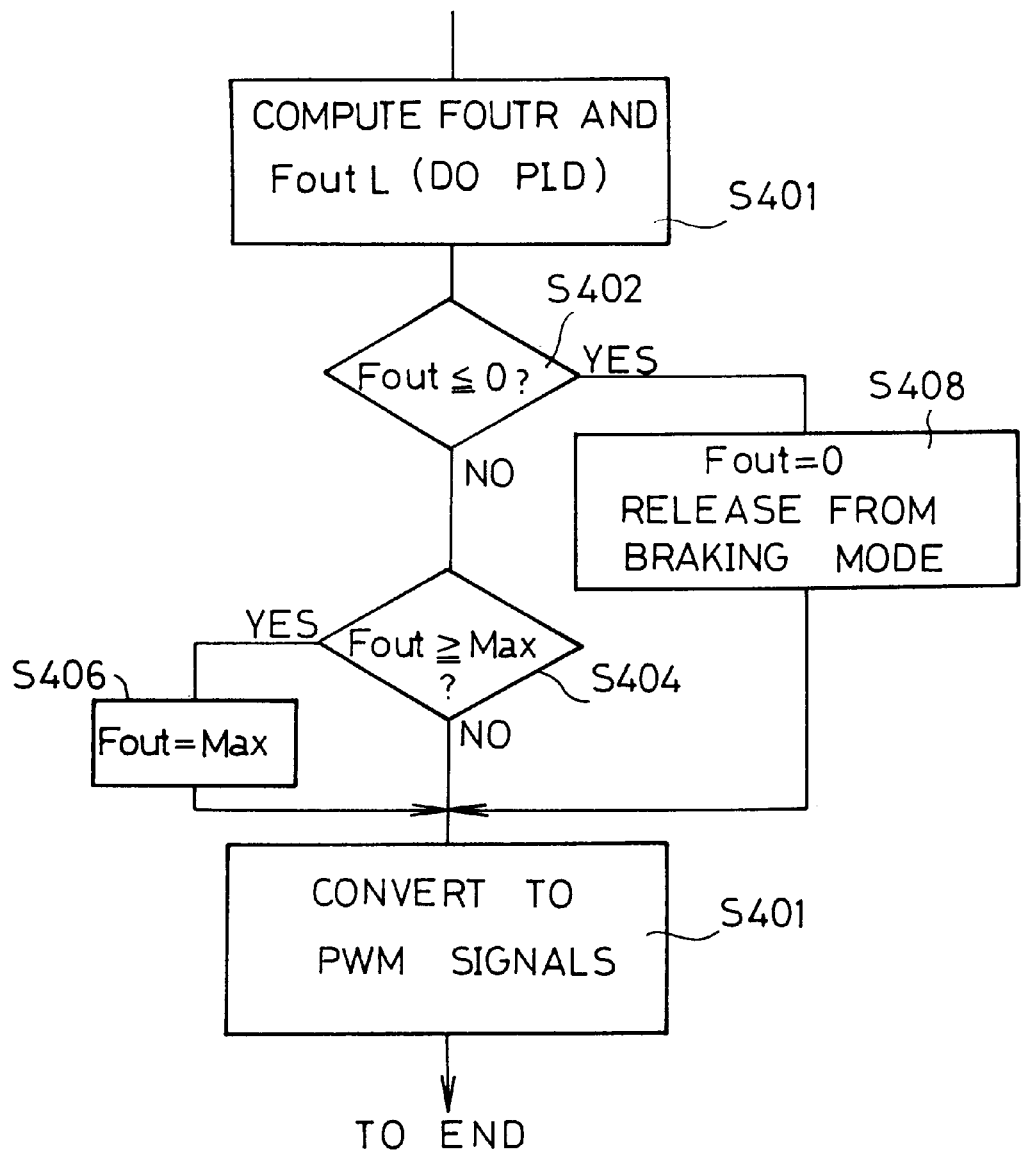
FIG. 13 is a flow chart illustrating how a PWM signal is developed in the driving mode of the motor-driven wheelchair.

The preliminary motor driving signals Fa-r(t) and Fa-l(t) are converted into PWM signals for application to the drive units 22R and 22L, respectively (Step S40). More specifically, as shown in FIG. 13, the new preliminary motor driving signals Fa-r(t) and Fa-l(t) are first converted to the actual motor driving signals FoutR and FoutL, respectively (Step S401). This conversion is carried out by executing PID operation on the preliminary motor driving signals Fa-r(t) and Fa-l(t) for gain adjustment.

Next, whether FoutR is greater than zero or not is judged (Step S402). If FoutR is greater than zero, whether FoutR is less than a maximum or not is judged (Step S404). If FoutR is equal to or greater than the maximum, FoutR is rounded to the maximum (Step S406). Similarly, if FoutL is judged to be greater than zero in Step S402, whether FoutL is less than a maximum or not is judged in Step S404. If FoutL is equal to or greater than the maximum, FoutL is rounded to the maximum (Step S406).

If FoutR is judged to be equal to or less than zero in Step 402, FoutR is treated as zero, and, similarly, if FoutL is judged to be equal to or less than zero, FoutL is treated as zero. If both of FoutR and FoutL are zero, the wheelchair is released from the driving mode (Step S408).

Following Step S406 or S408, FoutR and FoutL are converted into PWM signals for application to the drive units 22R and 22L, respectively (Step S410).

The driving mode of operation of a motor-driven wheelchair similar to the one described in this specification is described in detail in U.S. patent application Ser. No. 08/976,318 filed on Nov. 21, 1997 which is incorporated herein by reference and which can be referred to for further details of the driving mode of the wheelchair of the present application.

Braking Mode

Now, the braking mode of operation is described with reference to FIGS. 3A, 3B and 3C. In the braking mode of operation, the dynamic braking provided by the motors 12R and 12L are gradually increased from zero when manual driving force is removed from the manual-driving-force sensing units 32R and 32L.

Figure 3A:
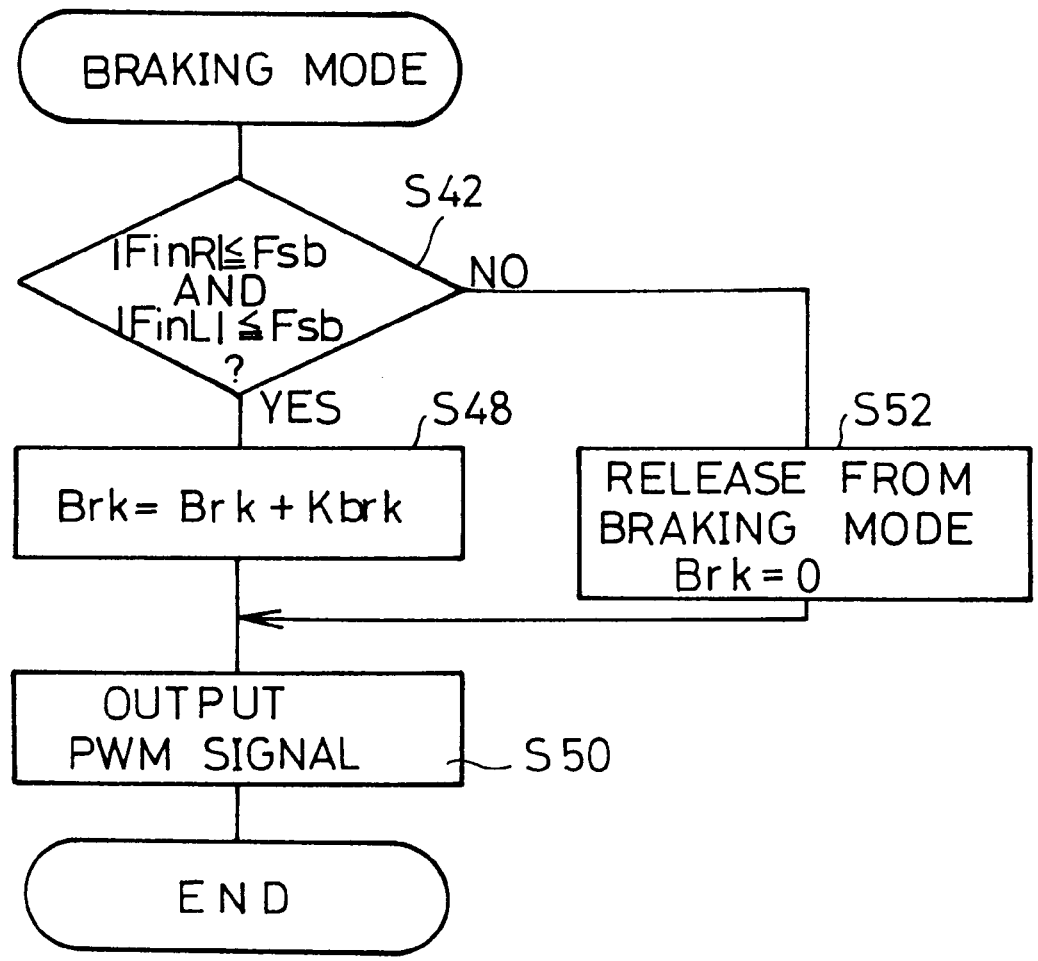
FIGS. 3A, 3B and 3C are flow charts for use in explaining the braking routine of a motor-driven wheelchair according to a first embodiment of the present invention.

In the braking mode, first, as shown in FIG. 3A, whether neither of the absolute values of the right and left manual-driving-force representative signal FinR and FinL are greater than Fsb is judged (Step S42). In other words, whether FinR and FinL are in the range between −Fsb and Fsb shown in FIG. 7 is judged. If both of the absolute values of FinR and FinL are judged to be equal to or less than Fsb, it may be considered that no manual driving force is being applied to the manual-driving-force sensing units 32R and 32L. Then, Step S48 is executed.

In Step S48, a predetermined amount of change Kbrk is added to the braking command value Brk, which is initially set to zero. The braking command value Brk is converted into a PWM signal having a corresponding duty ratio (Step S50) and, then, applied to the drive units 22R and 22L. Then, the drive units 22R and 22L control the respective motors 12R and 12L to provide dynamic braking in accordance with the PWM signal applied thereto.

Figure 14:
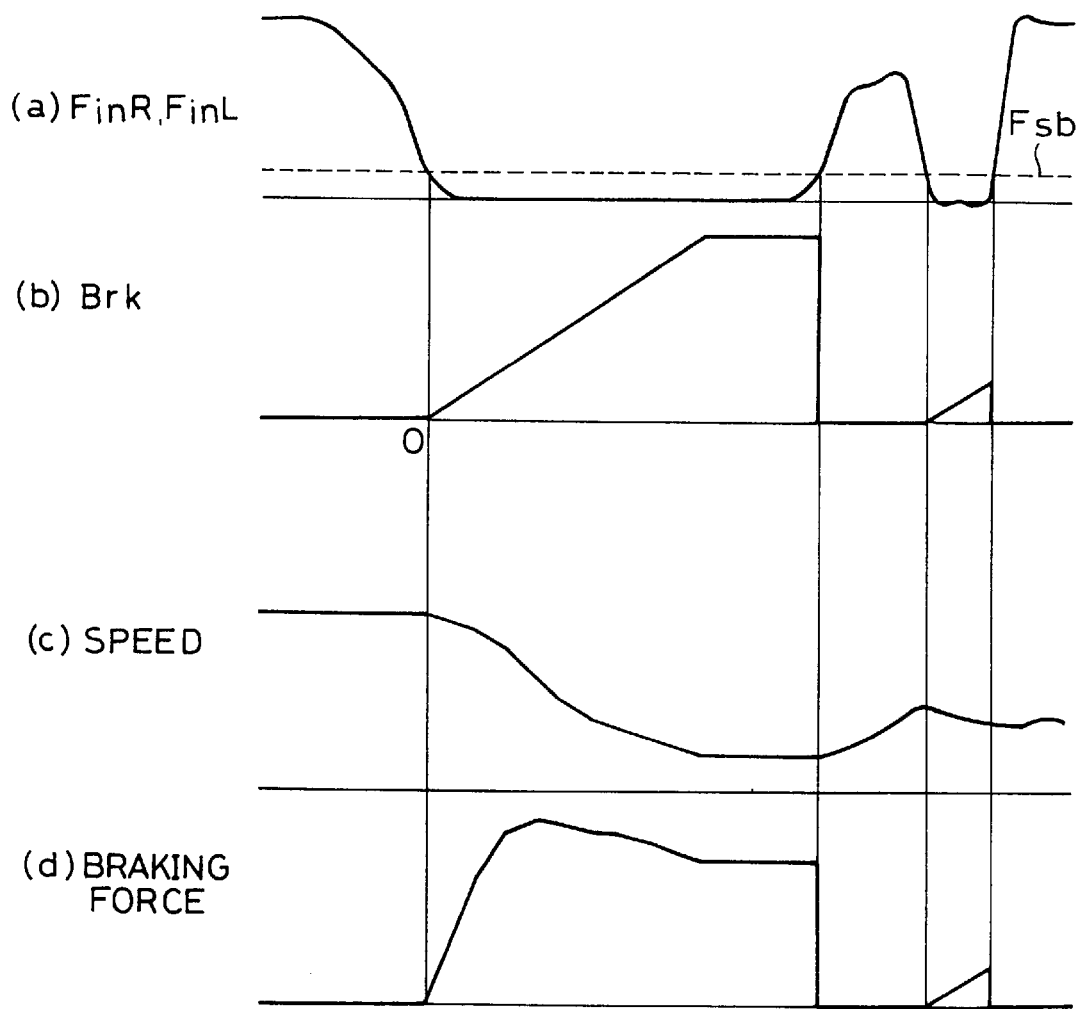
FIG. 14 shows a relationship among a manual driving force, a braking command, a wheelchair speed and a braking force in the braking mode of the motor-driven wheelchair.

For example, during a H-level (high level) interval of the PWM signal, the motors 12R and 12L may be short-circuited, while they are open-circuited when the PWM signal is at a L-level (low level). Each time the wheelchair is placed in the braking mode, the braking command value Brk is increased by the change amount Kbrk, as shown in FIG. 14(b). Although the braking command values are not shown in FIG. 14, when it attains a predetermined maximum value, e.g. 255, it keeps the maximum value.

The duty ratio of the PWM signal changes with the increase of the braking command value, and, therefore, the dynamic braking force also gradually increases as shown in FIG. 14(d). Accordingly, the speed of the motor-driven wheelchair gradually decreases as shown in FIG. 14(c). Thus, the wheelchair is braked without giving any shock to a person on the wheelchair. Steps S48 and S50 provide the function of the braking force providing means.

FIG. 14(a) shows a change of the manual driving forces.

If the answer to the question in Step S42 is NO, i.e. if the manual-driving-force representative signals FinR and FinL are outside the range of from −Fsb to Fsb, the wheelchair is released from the braking mode, and the braking command value Brk is set to zero (Step S52). Then, the braking mode is ended.

Modification 1 of Braking Mode

In the above-described example, the change amount Kbrk is fixed. However, a different change amount Kbrk may be used depending on operating conditions. For example, different values for Kbrk may be preset, and, if the wheelchair is moving at a high speed when the driver wants to brake it, a relatively large change amount may be selected to cause a large braking force to be generated, whereas at a low speed of the wheelchair, a relatively small Kbrk may be employed so that a smaller braking force may be provided.

Modification 2 of Braking Mode

As described above, unless the manual driving forces change, the braking command value is incremented by Kbrk each time the driving mode is executed. However, the braking command value Brk may be increased every plural executions of the driving modes, e.g. every other execution or every three executions of the driving mode. This can provide a gradual change of the braking force.

Modification 3 of Braking Mode

As described above, the wheelchair goes out from the braking mode when the manual-driving-force representative signals FinR and FinL are outside the range of from −Fsb to Fsb. Accordingly, if FinR and FinL are transitionally stay in the range of from −Fsb to Fsb and go out of the range soon after, the braking force is removed soon after it is provided. According to Modification 3, only when the manual-driving-force representative signals FinR and FinL stay in the range of from −Fsb to Fsb for more than a predetermined time, it is judged that the wheelchair driver has removed his hands from the manual driving force sensing units, and the braking force is provided.

Figure 3B:
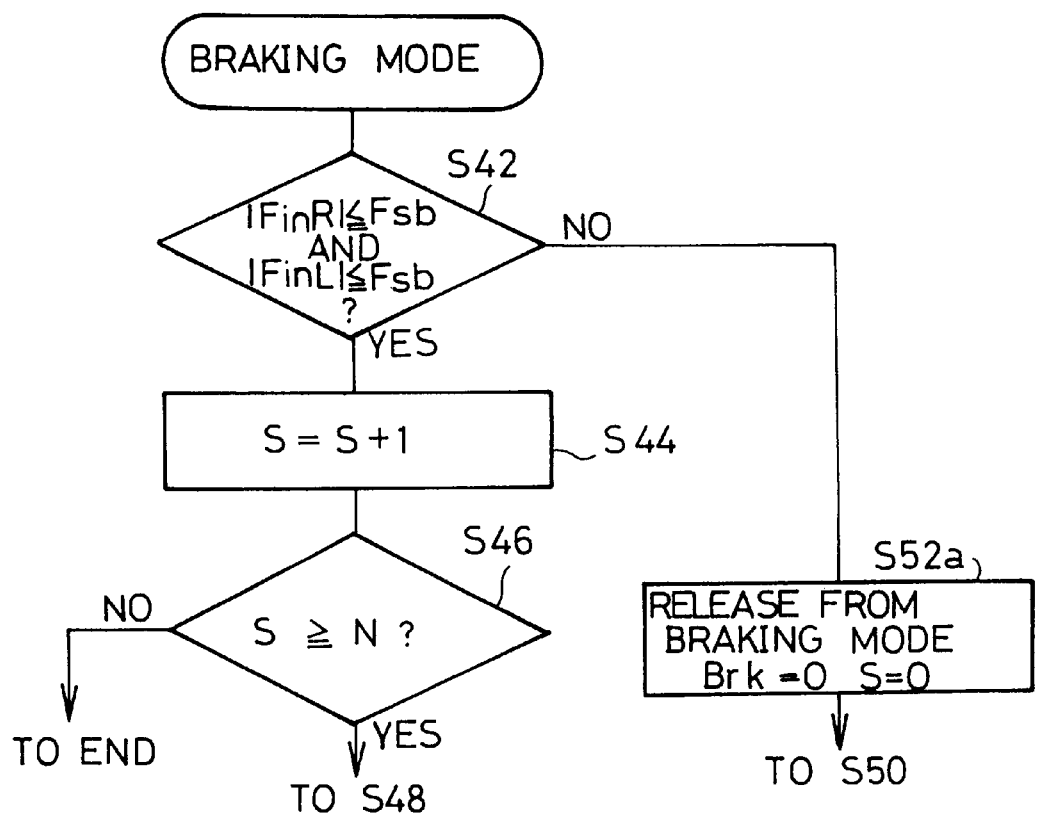

Specifically speaking, as shown in FIG. 3B, when the answer to Step S42 is YES, i.e. when the absolute values of both of FinR and FinL are equal to or less than Fsb, the control circuit 24 increments the count S in a software counter by 1 (Step S44). In Step S46, a judgement is made as to if the count S is not smaller than a number N corresponding to, for example, 0.5 seconds is judged (Step S46). If the answer is NO, the wheelchair goes out of the braking mode, and a predetermined sampling time after, the main routine shown in FIG. 6 is executed again. In the main routine, after Steps S2, S4 and S8 are executed, the braking mode (Step S10) is executed. In this way, when the braking mode is executed a number of times corresponding to the number N, the answer to Step S46 changes to YES, and Step S48 is executed. The counter is set to zero when electric power is supplied to the wheelchair. The counter is set to S52a is executed.

Modification 4 of Braking Mode

Figure 3C:
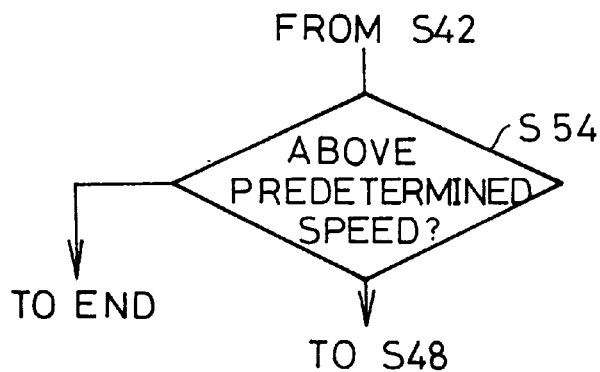

As shown in FIG. 3C, in place of Steps S44 and S46, a Step S54 may be used to judge whether the speed of the wheelchair exceeds a predetermined value or not. In this variation, if the wheelchair is at such a speed that the braking force should not be applied, the motors 12R and 12L are not caused to provide braking force even when the manual-driving-force representative signals FinR and FinL are in the range of from −Fsb to Fsb.

The speed of the wheelchair may be measured by counting the number of pulses generated in a unit time in proportion to the rotation of the motors 12R and 12L. Alternatively, it may be measured by an encoder or tachometer generator mounted in association with the rotary sections of the motors 12R and 12L.

Modification 5 of Braking Mode

Figure 15:
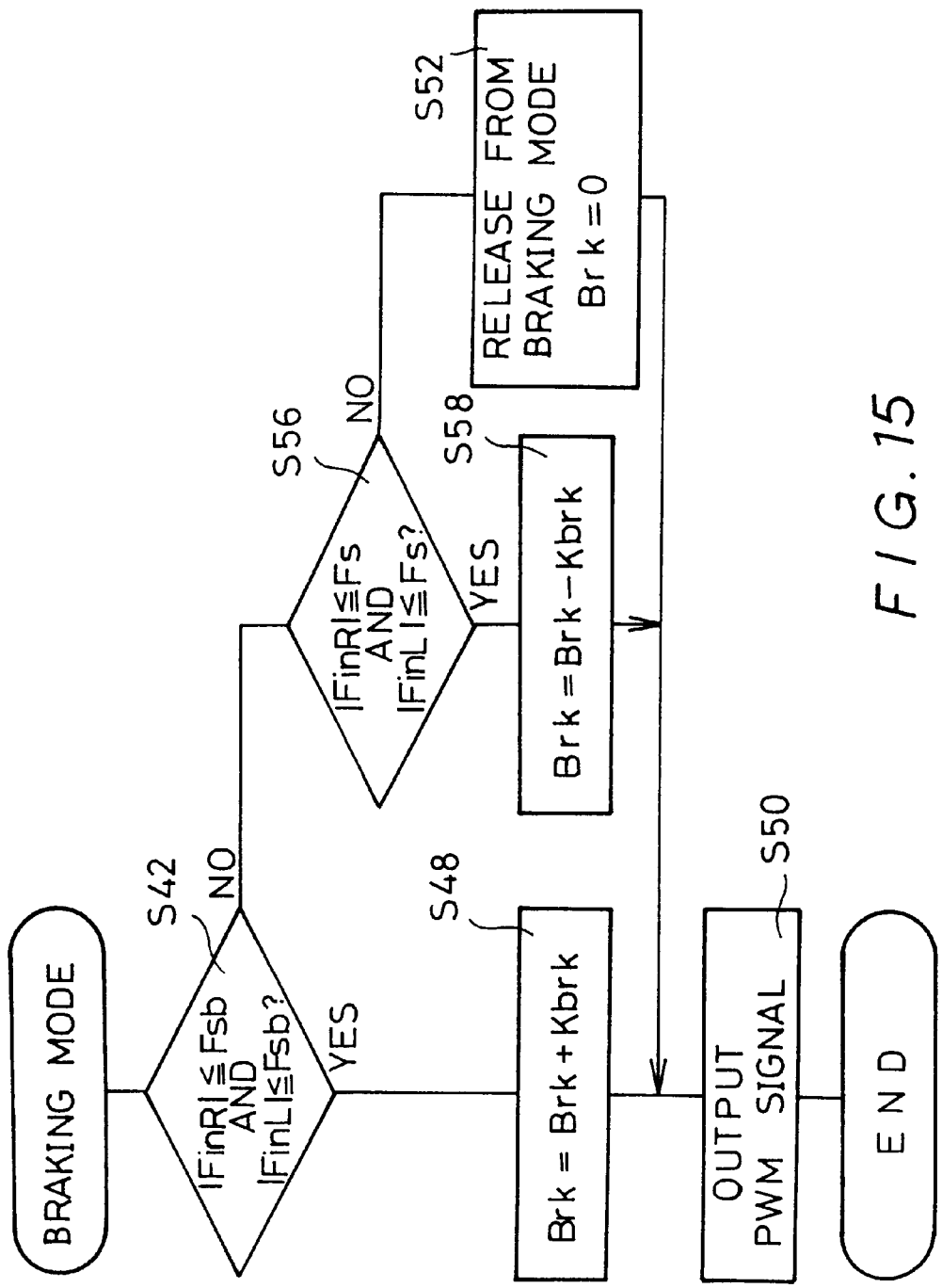
FIG. 15 is a flow chart illustrating a modified form of the braking mode of operation of the motor-driven wheelchair.

In the braking operation as illustrated in FIG. 3A, when the manual-driving-force representative signals FinR and FinL go out of the range of from −Fsb to Fsb, the braking command value Brk is immediately set to zero. However, as shown in FIG. 15, the braking force may be reduced gradually when FinR and FinL go out of the range of from −Fsb to Fsb. By doing so, abrupt shock to the wheelchair user can be prevented, which could otherwise be given when the operating mode is switched from the braking mode to the driving mode.

Specifically, when the answer to Step S42 is NO, whether or not the absolute values of both of the manual-driving-force representative signals FinR and FinL are equal to or less than the reference value Fs is judged (Step S56). In other words, Step S56 judges if the operation mode is the OFF mode shown in FIG. 7.

If the answer to the question in Step S56 is YES, i.e. if the absolute values of both of FinR and FinL are equal to or less than Fs, the braking command value Brk is decreased by the change amount Kbrk (Step S58), and Step S50 is performed.

If the answer to Step S56 is NO, Steps S52 and S50 are executed.

Modification 6 of Braking Mode

In the above-described various examples of the braking mode, the change amount Kbrk is always constant. However, the change amount Kbrk may vary depending on the conditions of the wheelchair after it is braked. For example, a software function generator may be used in place of Step S48, to which a variable having a value varying with time is applied. For example, the count counted by a software counter which is incremented by a predetermined value each time Step S42 provides the answer YES may be applied to the software function generator, and the output of the function generator is used as the braking command value Brk. The function generator may be provided with any function only if it can provide a change amount which decreases as time passes.

Modification 7 of Braking Mode

In the examples of the braking mode thus far described, only if FinR and FinL are in the range of from −Fsb to Fsb, the change amount Kbrk is fixed regardless of the locations of FinR and FinL in the range or regardless of the change of FinR and FinL in the range. However, depending on the locations in the range of from −Fsb to Fsb of FinR and FinL or depending on in what manner FinR and FinL change within this range, the change amount Kbrk may be varied.

Figure 16:
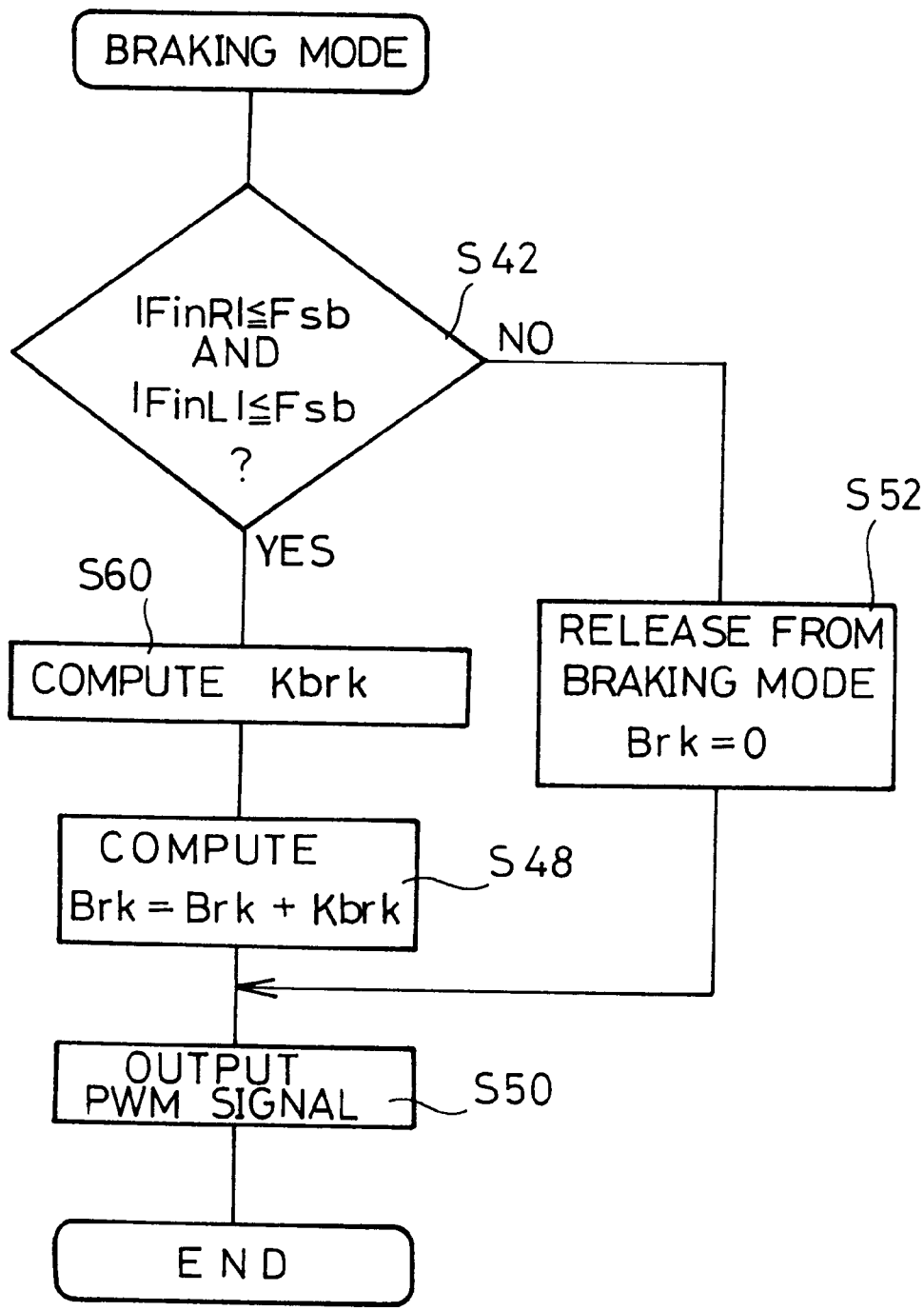
FIG. 16 is a flow chart illustrating another modified form of the braking mode of operation of the motor-driven wheelchair.

As shown in FIG. 16, first Step S42 is executed, as in the case of FIGS. 3A, 3B and 3C. If the judgment made in this step is YES, i.e. if the absolute values of both FinR and FinL are equal to or smaller than Fsb, the amount of change, Kbrk, by which the braking command is to be change is computed (Step S60).

The braking command change amount Kbrk is determined in accordance with a table like the one shown in FIG. 17 which is provided in a memory within the control circuit 24. As shown in FIG. 7, the range of from −Fsb to Fsb for FinR and FinL is further divided into three regions, namely, a zero region containing zero, e.g. a region of values not smaller than −Fsb/2 but not greater than Fsb/2, and two outside regions outside the zero-containing region, e.g. a region of values not smaller than −Fsb but smaller than −Fsb/2, and a region of values greater than Fsb/2 but not greater than Fsb. The change amount Kbrk is determined depending on in which regions FinR and FinL lie, and, in case that FinR and FinL are currently in one(s) of the three regions, whether FinR and FinL have moved into the current region(s) from other region(s) they were in the last braking mode operation, or they have remained in the current region(s) since the last braking operation.

In other words, there are the following four cases in which both FinR and FinL have not substantially moved from the region(s) where they were in the previous braking operation.

(1) The absolute values of FinR and FinL are between zero and Fsb/2 (both inclusive), i.e. FinR and FinL have values which are not smaller than −Fsb/2 but not greater than Fsb/2. In this case, the attendant is applying substantially no manual driving force to the manual-driving-force sensing units 32R, 32L, so that it may be permitted to take it that the wheelchair driver intends to brake the wheelchair. For this purpose, the largest change amount of four (4) is selected to provide a large braking force.

(2) The absolute value of FinL is not smaller than zero but not greater than Fsb/2 and the absolute value of FinR is greater than Fsb/2 but not greater than Fsb (i.e. FinR is greater than −Fsb/2 but not greater than Fsb/2). In this case, since the wheelchair driver is applying substantially no manual driving force to the left manual-driving-force sensing unit 32L and applying some magnitude of manual driving force to the right manual-driving-force sensing unit 32R. It may be considered that the wheelchair driver still intends to brake the wheelchair but may want to reduce the change amount of the braking force. Therefore, a smaller change amount of three (3) is employed.

(3) The absolute value of FinL is greater than Fsb/2 but not greater than Fsb and the absolute value of FinR is not smaller than zero but not greater than Fsb/2. This is the same as the case (2), except that the relationship in magnitude of FinR and FinL is reversed. In this case, too, the change amount of three (3) is employed.

(4) The absolute values of both FinR and FinL are greater than Fsb/2 but not greater than Fsb. In this case, since more or less larger manual driving forces are being applied to the manual-driving-force sensing units 32R and 32L, it may be considered that the wheelchair driver intends to keep the wheelchair in the braked condition but wanting to make the change amount smaller than those in the cases (2) and (3). Accordingly, the smallest change amount of two (2) is employed.

There are also the following four cases in which both FinR and FinL change.

(1) The absolute value of FinR is equal to zero or greater but not greater than Fsb/2, and the absolute value of FinL is equal to zero or greater but not greater than Fsb/2. This means that though both of the manual driving forces are small, they have changed, which, in turn, means that the wheelchair driver may intend to release the wheelchair from the braking mode, but his intention may not be firm. Accordingly, the change amount of zero (0) is employed to keep the current braking force.

(2) The absolute value of FinL is equal to or greater than zero but not greater than Fsb/2, and the absolute value of FinR is greater than Fsb/2 but not greater than Fsb.

(3) The absolute value of FinL is greater than Fsb/2 but not greater than Fsb, and the absolute value of FinR is equal to or greater than zero but not greater than Fsb/2.

(4) The absolute values of both FinL and FinR are greater than Fsb/2 but not greater than Fsb.

In these cases (2), (3) and (4), it is justifiable to consider that the wheelchair driver intends to release the wheelchair from the braking mode. In addition, since one of FinL and FinR is at least equal to or greater than −Fsb but smaller than −Fsb/2, or greater than Fsb/2 but not greater than Fsb, the driver's intention may be firmer than in the case of (1). Accordingly, a change amount of negative value, for example, −2, is employed to reduce the braking force.

There are eight cases in which one of the manual driving forces changes with the other remaining unchanged.

(1) FinL has changed to have an absolute value not smaller than 0 but not greater than Fsb/2, and FinR has not changed and has an absolute value not smaller than 0 but not greater than Fsb/2.

(2) FinR has changed to have an absolute value not smaller than 0 but not greater than Fsb/2, and FinL has not changed and has an absolute value not smaller than 0 but not greater than Fsb/2.

In the cases (1) and (2), both of the manual driving forces, regardless whether they have changed or not, are small in magnitude. It is, therefore, difficult to definitely determine whether the wheelchair driver intends to keep the wheelchair in the braking mode or release it from the braking mode. But, it may be justifiable to consider that the driver is more likely to maintain the braking mode. Therefore, the smallest amount of change for maintaining the braking mode, which is equal to two (2), is employed.

(3) FinL has changed to have an absolute value not smaller than 0 but not greater than Fsb/2, and FinR has not changed and has an absolute value greater than Fsb/2 but not greater than Fsb.

(4) FinR has changed to have an absolute value not smaller than 0 but not greater than Fsb/2, and FinL has not changed and has an absolute value greater than Fsb/2 but not greater than Fsb.

In the cases (3) and (4), the magnitude of the manual driving force which has changed is very small, while the manual driving force which has not changed is larger. In these case too, it is difficult to determine whether the wheelchair driver intends to maintain the braking mode or to release the wheelchair from the braking mode. However, it is more likely, than in the cases (1) and (2), that the driver is intending to release the wheelchair from the braking mode, and, therefore, the change amount of zero (0) is used to keep the current braking state.

(5) FinL has changed to have an absolute value greater than Fsb/2 but not smaller than Fsb, while FinR has not changed and has an absolute value greater than zero but not greater than Fsb/2.

(6) FinR has changed to have an absolute value greater than Fsb/2 but not greater than Fsb, while FinL has not changed and has an absolute value not smaller than zero but not greater than Fsb/2.

In the cases (5) and (6), the manual driving force which has changed is relatively large, whereas the manual driving force which has not changed is relatively small. From this fact, it is more likely than in the cases (3) and (4) that the driver intends to release the wheelchair from the braking mode. Accordingly, a change amount equal to −1, which is smaller than the change amount of −2 for releasing the wheelchair from the braking mode, is employed.

(7) FinL has changed to have an absolute value greater than Fsb/2 but not greater than Fsb, whereas FinR has not changed and has an absolute value greater than Fsb/2 but not greater than Fsb.

(8) FinR has changed to have an absolute value greater than Fsb/2 but not greater than Fsb, whereas FinL has not changed and has an absolute value greater than Fsb/2 but not greater than Fsb.

In the cases (7) and (8), both the manual driving force which has changed and the manual driving force which has not changed are relatively large. It is highly possible that the driver may intend to release the wheelchair from the braking mode. Accordingly, the change amount of −1 is used.

The change amount for the braking command value is determined in the manner described above, in Step S60. After that, Steps S48, S50 and S52 similar to those shown in and described with reference to FIG. 3A are executed. In FIG. 16, Steps S44 and S46 (FIG. 3B) or Step 554 (FIG. 3C) are not shown. But, they may be included in the modification of FIG. 16, too.

Further, the change amount may be determined depending on the regions where the manual driving forces or manual-driving-force representative signals belong, without considering whether the manual driving forces have changed or not. In such a case, when the manual-driving-force representative signals FinR and FinL are both greater than −Fsb/2 but not greater than Fsb/2, the largest change amount is used, and when FinR and FinL are both smaller than −Fsb/2 but not smaller than −Fsb, or greater than Fsb/2 but not greater than Fsb, the smallest change amount is used. When FinR and FinL are in the region(s) other than the above-described ones, a change amount lying between the largest and smallest change amounts may be used.

Figure 18:
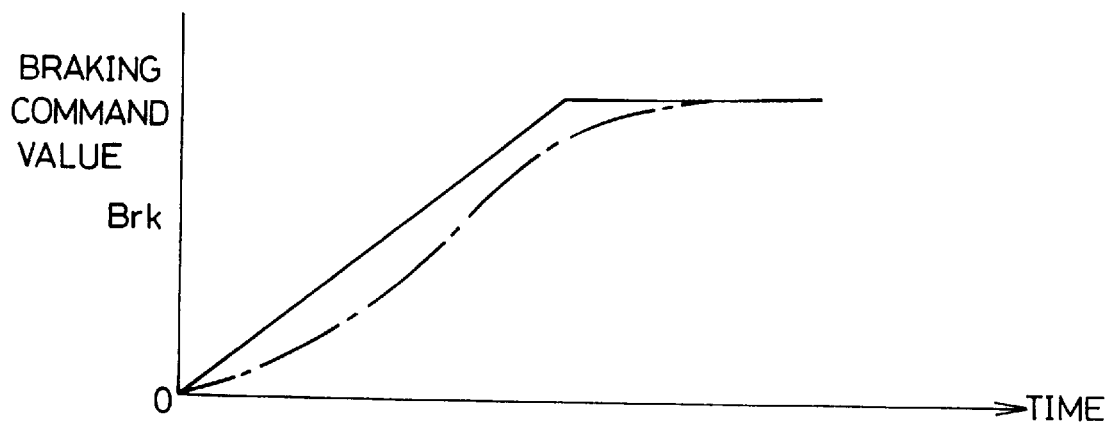
FIG. 18 shows changes in value of the braking command in the braking mode as illustrated in FIG. 16 and in the braking mode as illustrated in FIGS. 3A, 3B or 3C.
Figure 22:
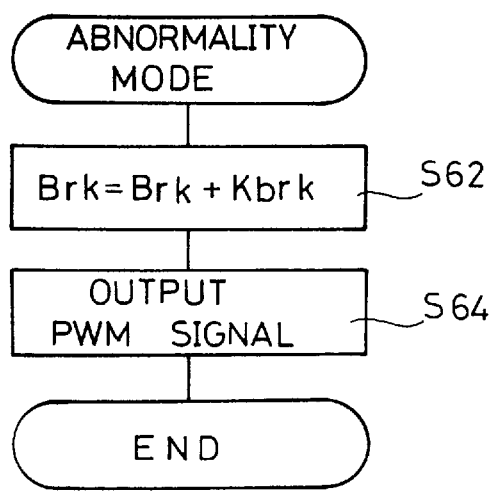
FIG. 22 is a flow chart illustrating the operation of the motor-driven wheelchair in an abnormal mode.

FIG. 18 exemplifies how the braking command value Brk changes when the change amount employed is changed as indicated by a dot-and-dash line. For comparison, an example of change of the braking command value Brk when the change amount is fixed is also shown. From the illustration in FIG. 18, it will be understood that depending on the magnitudes of the right and left manual driving forces and depending on whether they have been changed or not, the braking force provided varies.

Modification 8 of Braking Mode

In the braking mode thus far described, the maximum value of the braking command Brk is set to, for example, 255 regardless of the values of the manual-driving-force representative signals FinR and FinL. However, the maximum value of the braking command Brk may be varied in relation to the values of the manual-driving-force representative signals FinR and FinL.

Figure 19:
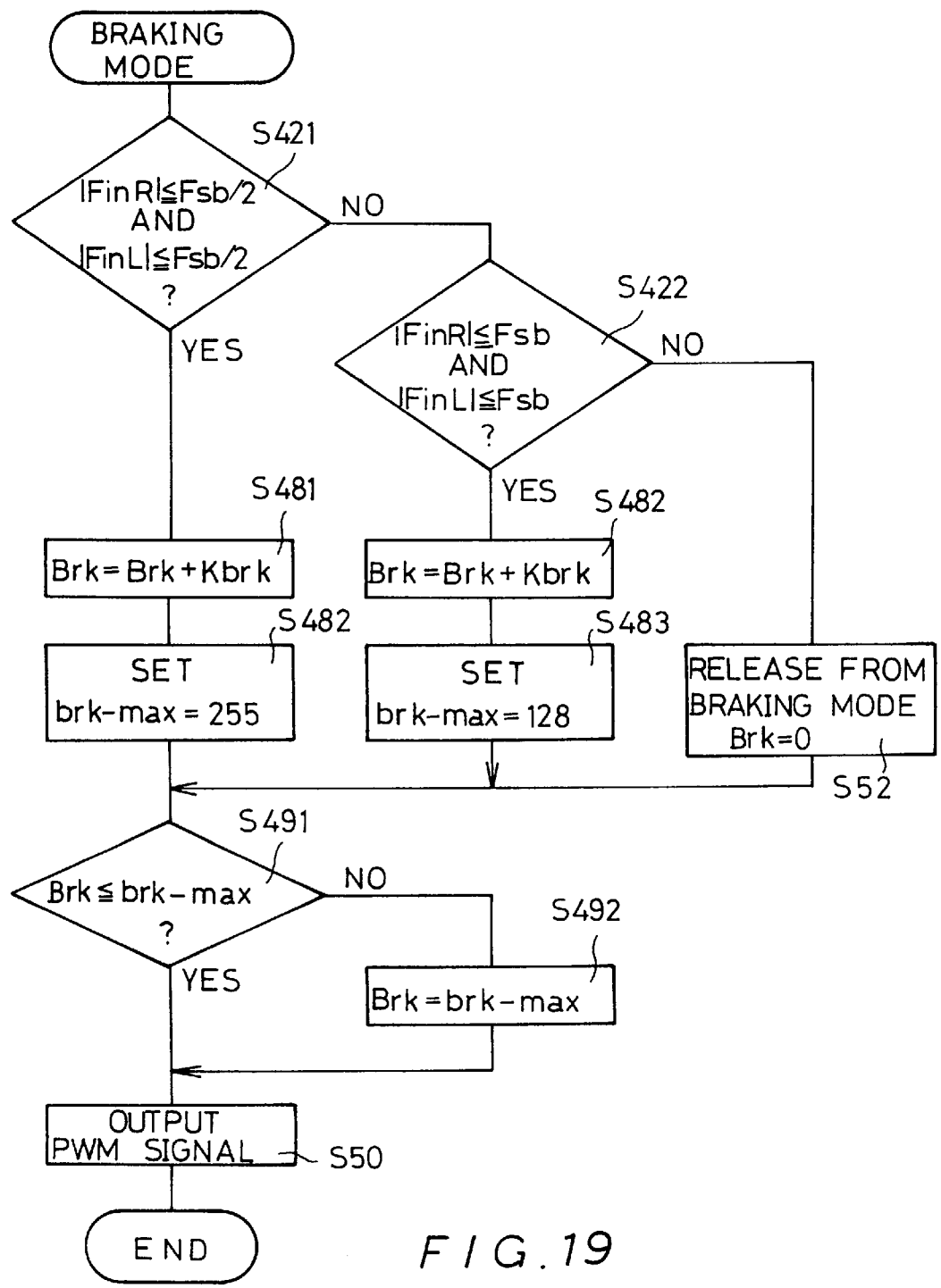
FIG. 19 is a flow chart illustrating still another modified form of the braking mode.

For example, as shown in FIG. 19, when the wheelchair enters into the braking mode of operation, a judgment is made as to whether the absolute values of both FinR and FinL are equal to or greater than Fsb/2 (Step S421). In other words, a judgment is made as to whether both FinR and FinL are in the zero-containing region, e.g. in the region between −Fsb/2 and Fsb/2 shown in FIG. 7. If they are in the zero-containing region, i.e. the answer to the question of Step S421 is YES, the braking command Brk is changed by the change amount Kbrk (Step S481), and the maximum value brk-max for the braking command Brk is set to 255 as shown in FIG. 20 (Step S482).

If the answer to the question in Step S421 is NO, a judgment is made as to whether the absolute values of both FinR and FinL are not greater than Fsb (Step S422). Step S422 is executed when the absolute values of both FinR and FinL are judged to be greater than Fsb/2 in Step S421, so that the judgment made in Step S422 is a judgment as to whether FinR and FinL are in the outside region(s), i.e. the outside region extending between −Fsb and −Fsb/2 and/or the outside region extending between Fsb and Fsb/2. If the answer to Step S422 is YES, the braking command Brk is changed by the change amount Kbrk (Step S482), and the maximum value brk-max for the braking command Brk is set to 128 as shown in FIG. 20 (Step S483). If the answer to the question made in Step S422 is NO, i.e. if one of FinR and FinL is greater than Fsb, the braking mode is ended and Brk is set to zero (Step S52).

Following Step S482, S483 or S52, a judgment is made as to whether the braking command value Brk is equal to or smaller than brk-max (Step S491). If the answer to the question made in Step S491 is YES, Step S50 described previously is carried out. If the answer to Step S491 is NO, Brk is set to brk-max (Step S492), and after that, Step S50 is executed.

According to Modification 8, when one of FinR and FinL is between Fsb and Fsb/2 in the braking mode, if even a little manual driving force applied to the wheelchair, the braking force is increased so gradually that shock can be prevented from being abruptly given to the wheelchair, while preventing the braking force from becoming too large. Accordingly, for a small manual driving force applied to the wheelchair, the braking force is not large, and, therefore, the wheelchair driver need not apply a large manual driving force to move the wheelchair. Accordingly, the wheelchair never moves abruptly and, therefore, its behavior can be stabilized.

According to Modification 8 described above, in order for the maximum value of the braking command value to be higher as the manual driving force is nearer to zero, the absolute values of FinR and FinL are compared with Fsb/2 and Fsb in Steps S421 and S422, and the maximum value of the braking command value is set to one of two values. Specifically, for the absolute values of FinR and FinL not greater than Fsb/2, the maximum value of the braking command value is set to 255, and for the absolute value not greater than Fsb, the upper limit is set to 128. However, the number of the upper limits need not be limited two, but FinR and FinL may be compared with more reference values to set the braking command to one of multiple upper limits.

Modification 9 of Braking Mode

In the above-described braking mode, the braking force is increased to its upper limit regardless of the speed of the wheelchair. According to Modification 9, the braking command value is increased until the speed of the wheelchair decreases to a predetermined speed, and, after that, the braking command value is gradually decreased to keep the wheelchair at a speed around the predetermined speed.

Figure 21:
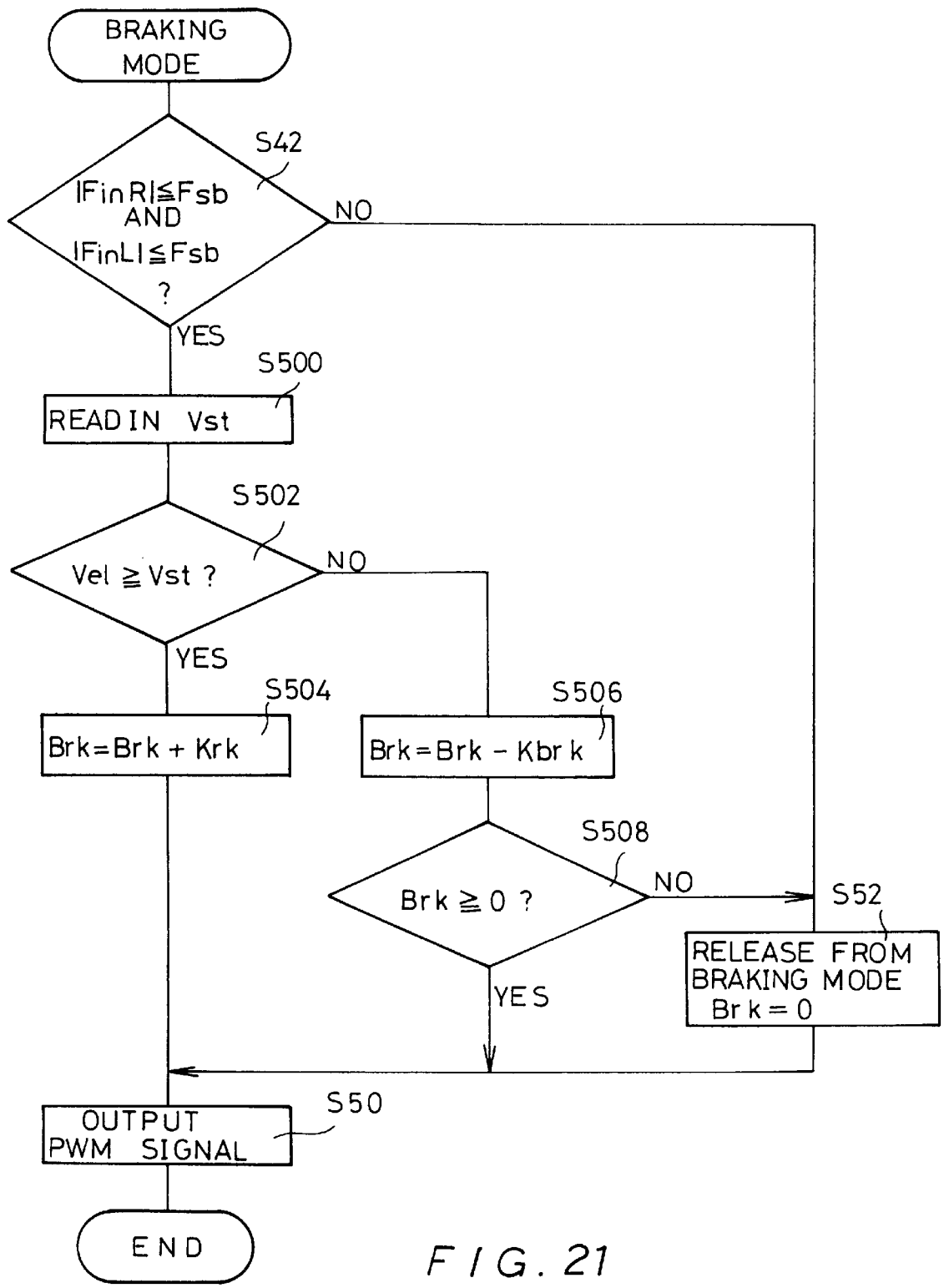
FIG. 21 is a flow chart illustrating a further modified form of the braking mode of the motor-driven wheelchair.

This modification is shown in FIG. 21. As shown in FIG. 21, when the braking mode of operation starts, Step S42 is first executed. If the answer to the question in Step S42 is negative, Steps S52 and S50 are executed.

On the other hand, if the answer to the question in Step S42 is YES, a reference speed Vst preset in a memory within the control circuit 24 is read into the microprocessor (Step S500). Next, using a technique similar to the one described with reference to Modification 4, the speed Vel of the wheelchair is measured, and a judgment as to if Vel is not smaller than Vst (Step S502). If Vel is equal to or larger than Vst, the braking command value Brk is incremented by Kbrk (Step S504), and, after that, Step S50 is executed.

If the answer to the question in Step S502 is NO, i.e. if the wheelchair speed Vel is smaller than the reference speed Vst, the braking command value is reduced by Kbrk (Step S506). After that, if Brk is equal to or larger than zero is judged (Step S508). If the answer to the question in Step S508 is YES, i.e. if Brk is equal to or larger than zero, Step S50 is executed. On the other hand if the answer is NO, i.e. if Brk is smaller than zero, Steps S52 and S50 are executed.

OFF Mode of Operation

In the OFF mode of operation, the generation of the PWM signal is discontinued, so that the motors 12R and 12L are permitted to freely rotate. If the wheelchair is suddenly switched from, for example, the braking mode to the driving mode, the motors 12R and 12L which have been braked start suddenly to be driven and the person on the wheelchair may be shocked by the sudden driving. In order to prevent it, the OFF mode of operation is interposed between the braking mode and the driving mode.

It should be noted, however, that when the braking mode shown in FIG. 15 is performed, the OFF mode does not take place because, in the case of FIG. 15, when the manual driving force enters into the OFF mode region, the braking force is gradually removed.

Abnormality Mode

As shown in FIG. 19, in the abnormality mode, first the braking command value Brk, which is initially set to zero, is increased by a predetermined change amount Kbrk (Step S62), and the PWM signal having a duty ratio corresponding to the increased braking command value Brk is outputted (Step S64). This provides dynamic braking to the motors 12R and 12L. Once the abnormality mode is entered, the wheelchair never shifts into other operating modes, but Steps S62 and S64 are repeated. This causes gradual increase of the dynamic braking force. Thus, even when the wheelchair becomes out of order, uncontrollable moving of the motor-driven wheelchair can be avoided.

Variations of Invention

In the above-described embodiment of the present invention, the braking of the vehicle is provided by dynamic braking. However, instead of dynamic braking, plugging, in which the motors 12R and 12L are driven to tend to rotate in the reverse direction, may be used. In this case, too, by gradually increasing the duty ratio of the PWM signal from zero, the braking force provided by plugging can be gradually increased. Once the wheelchair has attained a predetermined speed, e.g. zero speed, the braking force provided at that speed by plugging can be maintained thereafter by maintaining the duty ratio which the PWM signal has at the time when the wheelchair has reached that predetermined speed. With this arrangement, even when, for example, the wheelchair climbing up a slope is stopped, the vehicle's descending back due to its own weight can be prevented because the force equal in magnitude and opposite in direction to the force causing the wheelchair to go down the slope is provided and maintained by plugging.

Furthermore, in the above-described embodiment, the motor-driven wheelchair has been described as being moved by the combination of the manual driving forces provided by the wheelchair driver or attendant with the motor driving forces provided by the motors 12R and 12L. However, the control apparatus with the braking system of the present invention may be used for a motor-driven vehicle of the type including a joy stick which is manipulated by the person on the vehicle to produce electrical signals in response to the manipulation of the joy stick, and motors which are driven in response to such electrical signals.

What is claimed is:

1. A control apparatus for a motor-driven vehicle including a motor for driving said vehicle, comprising: a vehicle maneuvering section for producing an electric signal for use in driving said vehicle by said motor, said electric signal corresponding to the magnitude and direction of manipulation of said maneuvering section, and a control unit for causing a motor to produce a motor driving force having a magnitude and direction corresponding to said electric signal for driving the vehicle;

said control unit including braking force providing means for gradually increasing a braking force to be provided for said vehicle from zero when said control unit judges that the manipulation of said maneuvering section has been discontinued.

2. A control apparatus for a motor-driven vehicle including a motor for driving said vehicle, comprising: a vehicle maneuvering section for producing an electric signal for use in driving said vehicle by said motor, said electric signal corresponding to the magnitude and direction of manipulation of said maneuvering section, and a control unit for causing a motor to produce a motor driving force having a magnitude and direction corresponding to said electric signal for driving said vehicle;

said control unit including braking force providing means for gradually increasing from zero a braking command which causes said motor to produce a braking force when said control unit judges that the manipulation of said maneuvering section has been discontinued.

3. A control apparatus for a motor-driven vehicle including a motor for driving said vehicle, comprising: a maneuvering section which senses a manual driving force applied thereto to drive said vehicle and develops a manual-driving-force related signal related in magnitude and direction to said manual driving force applied to said maneuvering section, and a control unit for causing said motor to produce a motor driving force having a magnitude and direction determined by said manual-driving-force related signal;

said control unit including braking force providing means for gradually increasing from zero a braking command which causes said motor to produce a braking force when said control unit judges that said manual driving force has been removed.

4. The control apparatus as set forth in claim 3 wherein said control unit converts said manual-driving-force related signal into a manual-driving-force representative signal which is zero when no manual driving force is applied to said maneuvering section, and causes a motor driving force to be produced when the absolute value of the manual-driving-force representative signal reaches a reference value, said control unit judging that no manual driving force is being applied when the absolute value of said manual-driving-force representative signal becomes smaller than a judgment value which is smaller than said reference value but larger than zero.

5. The control apparatus as set forth in claim 4 wherein, when a motor driving force is developed, said control unit computes the difference between the value of said manual-driving-force representative signal and said reference value for use as a change amount for the motor driving force, and computes a new motor driving force with said difference taken into account.

6. The control apparatus as set forth in claim 3 wherein said control unit converts said manual-driving-force related signal into a manual-driving-force representative signal which is zero when no manual driving force is applied to said maneuvering section, said control unit switching the operating mode of said vehicle between a driving mode of operation in which said control unit causes said motor to produce a motor driving force having a magnitude and direction determined by said manual-driving-force representative signal, and a braking mode of operation in which said braking force providing means is operated, said control unit selecting said braking mode when, on condition that neither said driving mode nor braking mode has been selected, the absolute value of said manual-driving-force representative signal is not greater than a judgment value which is equal to or greater than zero.

7. The control apparatus as set forth in claim 6 wherein said control unit selects said driving mode when the absolute value of said manual-driving-force signal is not smaller than a reference value which is greater than said judgment value.

8. The control apparatus as set forth in claim 6 wherein said control unit activates said braking force providing means a predetermined time after said braking mode is selected.

9. The control apparatus as set forth in claim 6 wherein when said braking mode is selected, said control unit activates said braking force providing means on condition that said vehicle reaches a predetermined speed.

10. The control apparatus as set forth in claim 7 wherein, when neither said braking mode nor said driving mode has been selected, said control unit judges that the vehicle is in an OFF mode of operation and causes power supply to the motor to be stopped.

11. The control apparatus according to claim 7 wherein said control unit causes said braking command to gradually decrease when said manual-driving-force representative signal becomes to have an absolute value smaller than said reference value but greater than the judgment value on condition that the vehicle is in the braking mode.

12. The control apparatus as set forth in claim 6 wherein the value of said manual-driving-force representative signal is classified into a zero region containing the zero value and outside regions outside the zero region, and when said manual-driving-force representative signal is in said zero region in said braking mode of operation of said vehicle, said braking force providing means increases said braking command to a preset maximum value, when said manual-driving-force representative signal is in said outer regions, said braking force providing means increasing said braking command toward an upper limit value which is lower than said maximum value by a predetermined value.

13. The control apparatus as set forth in claim 6 in which when said braking mode is selected, said braking force providing means sets an upper limit for said braking command in accordance with the value of said manual-driving-force representative signal, said upper limit of said braking command being set higher as said manual-driving-force representative signal is nearer to the zero value.

14. A control apparatus for a motor-driven vehicle including a motor for driving said vehicle, comprising: a vehicle maneuvering section for producing an electric signal for driving said vehicle, said electric signal corresponding to the magnitude and direction of manipulation of said maneuvering section, and a control unit for causing said motor to produce a motor driving force having a magnitude and direction corresponding to said electric signal for driving the vehicle;

said control unit including braking force providing means for causing said motor to produce a dynamic braking force and gradually increasing said dynamic braking force from zero when said control unit judges that the manipulation of said maneuvering section has been discontinued.

15. A control apparatus for a motor-driven vehicle including a motor for driving said vehicle, comprising: a maneuvering section which senses a manual driving force applied thereto to drive said vehicle and develops a manual-driving-force related signal related in magnitude and direction to said manual driving force applied to said maneuvering section, and a control unit for causing said motor to produce a motor driving force having a magnitude and direction computed from said manual-driving-force related signal;

said control unit including braking force providing means for providing a braking command to cause said motor to produce a dynamic braking force and gradually increasing said braking command from zero when said control unit judges that said manual driving force has been removed.

16. The control apparatus as set forth in claim 15 wherein said control unit controls said motor by pulse width modulation (PWM), and said braking force providing means gradually increases a value of a PWM signal used as said braking command from zero.

17. The control apparatus as set forth in claim 16 wherein the value of said PWM signal is varied by a constant value each time said PWM signal is outputted.

18. The control apparatus according to claim 16 wherein the value of said PWM signal is varied by a value computed each time said PWM signal is outputted.

19. A control apparatus for a motor-driven vehicle including a motor for driving said vehicle, comprising: a maneuvering section which senses a manual driving force applied thereto to drive said vehicle and develops a manual-driving-force related signal related in magnitude and direction to said manual driving force applied to said maneuvering section, and a control unit for causing said motor to produce a motor driving force having a magnitude and direction computed from said manual-driving-force related signal;

said control unit including braking force providing means for providing a braking command to cause said motor to produce a plugging force and gradually increasing said braking command from zero when said control unit judges that said manual driving force has been removed.

20. The control apparatus as set forth in claim 19 wherein said control unit holds the value which said braking command assumes when the speed of said vehicles is judged to be zero.

21. A control apparatus for a motor-driven vehicle including a motor for driving said vehicle, comprising: a maneuvering section for sensing a manual driving force applied thereto to drive said vehicle and developing a manual-driving-force related signal related in magnitude and direction to said manual driving force applied to said maneuvering section, and a control unit for causing said motor to produce a motor driving force having a magnitude and direction as computed from said manual-driving-force related signal;

said control unit converting said manual-driving-force related signal into a manual-driving-force representative signal which is zero when no manual driving force is applied to said maneuvering section;

said control unit switching the operating mode of said vehicle between a driving mode of operation in which said control unit causes said motor to produce a motor driving force having a magnitude and direction determined by said manual-driving-force representative signal, and a braking mode of operation in which a braking force is produced in response to a braking command;

said control unit including braking force providing means for gradually increasing said braking command from zero when said braking mode is selected;

said braking mode being selected when the absolute value of said manual-driving-force representative signal is not greater than a judgment value which is greater than zero, on condition that neither the driving mode nor the braking mode has been selected;

said braking force providing means judging whether said manual-driving-force representative signal has changed or not, determining an change amount by which said braking command is to be changed, and outputting a new braking command prepared from said braking command with said change amount taken into account.

22. A control apparatus for a motor-driven vehicle including motors disposed on opposite sides of said vehicle for driving said vehicle, comprising: right and left maneuvering sections disposed on opposed sides of said vehicle for sensing manual driving forces applied to said right and left maneuvering sections to drive said vehicle and developing respective manual-driving-force related signals related in magnitude and direction to said manual driving forces applied to said respective right and left maneuvering sections, and a control unit for causing said motors to produce respective motor driving forces having a magnitude and direction as computed from said manual-driving-force related signals;

said control unit converting said manual-driving-force related signals into manual-driving-force representative signals which are zero when no manual driving forces are applied to said maneuvering sections;

said control unit switching the operating mode of said vehicle between a driving mode of operation in which said control unit causes said motors to produce respective motor driving forces each having a magnitude and direction determined by associated one of said manual-driving-force representative signals, and a braking mode of operation in which a braking force is produced in response to a braking command;

said control unit including braking force providing means for gradually increasing said braking command from zero when said braking mode is selected;

said braking mode being selected when the absolute values of said manual-driving-force representative signals are not greater than a judgment value which is greater than zero, under condition that neither the driving mode nor the braking mode has been selected;

said braking force providing means judging whether said manual-driving-force representative signals have changed or not, determining an change amount by which said braking command is to be changed, and outputting a new braking command prepared from said braking command with said change amount taken into account.

23. The control apparatus as set forth in claim 22 wherein said control unit selects said driving mode when the absolute value of either one of said manual-driving-force representative signals is equal to or greater than a reference value which is greater than said judgment value on condition that neither the driving mode nor the braking mode has been selected.

24. The control apparatus as set forth in claim 22 wherein when said braking force providing means judges that neither said right manual driving force nor said left manual driving force has changed, said braking force providing means sets the amount of change by which said braking command is to be changed to a value which increases said braking command.

25. The control apparatus as set forth in claim 24 wherein said values of said manual-driving-force representative signals are classified into a zero region containing zero and outside regions outside said zero region, and said amount of change by which said braking command is to be changed is determined depending on a combination of said regions in which said respective ones of said right and left manual-driving-force representative signals lie.

26. The control apparatus as set forth in claim 25 wherein said amount of change by which said braking command is to be changed is the largest when both of said right and left manual driving forces are in said zero region.

27. The control apparatus as set forth in claim 22 wherein when both of said right and left manual driving forces are judged to have changed, said braking force providing means sets the amount of change by which said braking command is to be changed to a value which decreases said braking command or to a value which is equal to zero.

28. The control apparatus as set forth in claim 27 wherein said values of said manual-driving-force representative signals are classified into a zero region containing zero and outside regions outside said zero region, and said braking force providing means sets the amount of change by which said braking command is to be changed to zero which causes said braking command to hold the current value when both of said right and left manual-driving-force representative signals lie in said zero region.

29. The control apparatus as set forth in claim 22 wherein said values of said manual-driving-force representative signals are classified into a zero region containing zero and outside regions outside said zero region, and, when one of said manual-driving-force representative signals is judged to have changed, while the other is judged not to have changed, said braking force providing means sets said amount by which said braking command is to be changed to such a value as to increase said braking command, to zero for causing said braking command to maintain the current value, or to such a value as to decrease said braking command, depending on a combination of said regions in which said manual-driving-force representative signals lie.

30. The control apparatus as set forth in claim 29 wherein said braking force providing means sets said amount by which said braking command is to be changed to such a value as to increase said braking command when both of said right and left manual-driving-force representative signals are judged to lie in said zero region.

31. The control apparatus as set forth in claim 29 wherein said braking force providing means sets said amount of change by which said braking command is to be changed to zero for causing said braking command to maintain the current value when one of said manual-driving-force representative signals is judged to lie in said zero region with the other lying in the outside region.

32. The control apparatus as set forth in claim 29 wherein said braking force providing means sets said amount by which said braking command is to be changed to such a value as to decrease said braking command when both of said right and left manual-driving-force representative signals are judged to be in said outside region.

33. A control apparatus for a motor-driven vehicle including motors disposed on opposite sides of said vehicle for driving said vehicle, comprising: right and left maneuvering sections disposed on opposed sides of said vehicle for sensing manual driving forces applied to said right and left maneuvering sections to drive said vehicle and developing respective right and left manual-driving-force related signals related in magnitude and direction to said manual driving forces applied to said respective maneuvering sections, and a control unit for causing said motors to produce respective motor driving forces having a magnitude and direction as computed from said manual-driving-force related signals;

said control unit converting said right and left manual-driving-force related signals into right and left manual-driving-force representative signals which are zero when no manual driving forces are applied to said maneuvering sections;

said control unit switching the operating mode of said vehicle between a driving mode of operation in which said control unit causes said motors to produce respective motor driving forces each having a magnitude and direction determined by associated one of said manual-driving-force representative signals, and a braking mode of operation in which a braking force is produced in response to a braking command;

said control unit including braking force providing means for gradually increasing said braking command from zero when said braking mode is selected;

said braking mode being selected when the absolute values of said manual-driving-force representative signals are not greater than a judgment value which is greater than zero, on condition that neither the driving mode nor the braking mode has been selected;

the values of said manual-driving-force representative signals being classified into a zero region containing zero and outside regions outside said zero region;

said braking force providing means determining an amount of change by which said braking command is to be change, depending on a combination of the regions in which said right and left manual-driving-force representative signals lie, and outputting a new braking command prepared from said braking command with said amount of change taken into account.

34. The control apparatus as set forth in claim 33 wherein said amount of change by which said braking command is to be changed is the largest when both of said right and left manual-driving-force representative signals are lying in said zero region and the smallest when both of said right and left manual-driving-force representative signals are lying in said outside region.

35. A control apparatus for a motor-driven vehicle including a motor for driving said vehicle, comprising: a vehicle maneuvering section for producing an electric signal for use in driving said vehicle by said motor, and a control unit for causing said motor to produce a motor driving force having a magnitude and direction corresponding to said electric signal for driving said vehicle;

said control unit including braking force providing means for gradually increasing a braking force from zero so that the speed of said vehicle decreases to a predetermined reference value when said control unit judges that the manipulation of said maneuvering section has been discontinued.

36. A control apparatus for a motor-driven vehicle including a motor for driving said vehicle, comprising: a maneuvering section for sensing a manual driving force applied thereto to drive said vehicle and developing a manual-driving-force related signal related in magnitude and direction to the manual driving force applied to said maneuvering section, and a control unit for causing said motor to produce a motor driving force having a magnitude and direction determined by said manual-driving-force related signal;

said control unit including braking force providing means for gradually increasing from zero a braking command which causes said motor to produce a braking force for decreasing the speed of said vehicle to a predetermined reference value when said control unit judges that said manual driving force has been removed.

37. The control apparatus as set forth in claim 36 wherein said braking force providing means gradually decreases said braking command after said vehicle attains said reference speed.

38. A control apparatus for a motor-driven vehicle including a motor for driving said vehicle, comprising: a maneuvering section for sensing a manual driving force applied thereto to drive said vehicle and developing a manual-driving-force related signal related in magnitude and direction to the manual driving force applied to said maneuvering section, and a control unit for causing a motor to produce a motor driving force having a magnitude and direction determined by said manual-driving-force related signal;

said control unit including braking force providing means for gradually increasing from zero a braking command to cause said motor to produce a braking force in an abnormal condition of said vehicle judged by said control unit when said manual-driving-force related signal has not changed for a predetermined time period.

* * * * *